US008843835B1

(12) United States Patent
Busey et al.

(10) Patent No.: US 8,843,835 B1
(45) Date of Patent: Sep. 23, 2014

(54) PLATFORMS, SYSTEMS, AND MEDIA FOR PROVIDING MULTI-ROOM CHAT STREAM WITH HIERARCHICAL NAVIGATION

(71) Applicant: Banter Chat, Inc., Austin, TX (US)

(72) Inventors: Andrew Thomas Busey, Austin, TX (US); Anthony Dan Chen, Austin, TX (US); Benjamin Edward Lamm, Austin, TX (US)

(73) Assignee: Banter Chat, Inc., Austin, TX (US)

( * ) Notice: Subject to any disclaimer, the term of this patent is extended or adjusted under 35 U.S.C. 154(b) by 0 days.

(21) Appl. No.: 14/197,095

(22) Filed: Mar. 4, 2014

(51) Int. Cl.
*G06F 3/048* (2013.01)

(52) U.S. Cl.
USPC ............................ 715/758; 715/739; 715/854

(58) Field of Classification Search
CPC  H04L 12/1818;  H04L 12/1813;  G06Q 10/10;
          G06Q 17/30873;  G06Q 50/01
USPC ........................................... 715/739, 758, 854
See application file for complete search history.

(56) References Cited

U.S. PATENT DOCUMENTS

| | | |
|---|---|---|
| 7,685,192 B1 | 3/2010 | Scofield et al. |
| 2010/0205541 A1 | 8/2010 | Rapaport et al. |
| 2010/0228777 A1 | 9/2010 | Imig et al. |
| 2011/0185025 A1 | 7/2011 | Cherukuri et al. |

*Primary Examiner* — Namitha Pillai
(74) *Attorney, Agent, or Firm* — Wilson Sonsini Goodrich & Rosati

(57) ABSTRACT

Described are chat platforms, systems, applications, and methods including multi-room chat streams and navigable, topical hierarchies of chat rooms navigable.

30 Claims, 29 Drawing Sheets

PLATFORMS, SYSTEMS, AND MEDIA FOR PROVIDING MULTI-ROOM CHAT STREAM WITH HIERARCHICAL NAVIGATION

BACKGROUND OF THE INVENTION

Chat involves communication over the Internet that offers a real-time transmission of text messages from sender to receiver. A chat room is a virtual space allowing chat between users who are in the same chat room. Chat messages are generally short in order to enable other participants to respond quickly; a feeling similar to a spoken conversation is created, which distinguishes chatting from other text-based online communication forms such as Internet forums and email. In general, chat rooms are to some extent organized around a particular type of user, interest, or topic and more users in a chat room will result in a livelier, more interesting conversation.

SUMMARY OF THE INVENTION

Existing chat technologies suffer from shortcomings remedied by the subject matter disclosed herein. By way of example, current chat technologies fail to adequately allow users to navigate a hierarchy of chat rooms to access more general topics or more specific sub-topics. By way of further example, current chat technologies do not allow efficient use of multiple chat rooms simultaneously and are not sufficiently location based. Moreover, current chat technologies do not effectively manage the creation of new chat rooms or chat rooms with too few users to support an active discussion.

Advantages of the chat platforms, systems, media, and methods described herein include, but are not limited to providing a location based, topical hierarchy of chat rooms that users may traverse to fine tune their chat conversations, providing a chat stream allowing users to carry on many chat conversations simultaneously, offering tools for creation of public and private chat rooms with a fine degree of user control, and supplying options and suggestions to help users access lively, engaging chat conversations at the desired level of topical specificity.

In one aspect, disclosed herein are chat platforms comprising: a plurality of mobile processors each configured to provide a mobile application comprising: a software module for allowing a user to browse and select a public chat room, the public chat room selected from a topical hierarchy of public chat rooms; a software module for allowing the user to create and enter a chat room, the chat room a public chat room or a private chat room; and a software module for presenting a chat stream to the user, the chat stream comprising chat messages from one or more entered chat rooms, the chat messages organized to form the stream; a server processor configured to provide a server application comprising: a database of public chat rooms and private chat rooms, each chat room comprising a topic, the public chat rooms organized into a hierarchy of public chat rooms; a software module for receiving a request from the user to enter a selected public chat room and in response to the request: entering the user into the selected public chat room where the selected public chat room has a pre-determined number of users; or entering the user into a public chat room higher in the topical hierarchy of public chat rooms where the selected public chat room has less than the pre-determined number of users; a software module for transmitting a notification to the user when the selected public chat room meets the pre-determined number of users; and a software module for consolidating chat messages from one or more chat rooms entered by the user to form a chat stream for the user. In some embodiments, one or more chat rooms comprise a topic based on location. In some embodiments, the topical hierarchy of public chat rooms is filtered based on location of the user. In some embodiments, the mobile application further comprises a software module for allowing the user to view a list of public rooms entered, the list configured to allow the user to swipe to navigate between public rooms. In some embodiments, the mobile application further comprises a software module for allowing the user to view a list of private rooms entered, the list configured to allow the user to swipe to navigate between private rooms. In some embodiments, the mobile application further comprises a software module for muting and leaving each entered room. In some embodiments, the pre-determined number of users is 2 to 10 users. In other embodiments, the pre-determined number of users is 10 to 100 users. In other embodiments, the pre-determined number of users is 100 to 1000 users. In other embodiments, the pre-determined number of users is 1000 to 5000 users. In some embodiments, the software module for allowing the user to create and enter a chat room includes features for inviting other users to join a created chat room. In some embodiments, the software module for allowing the user to create and enter a chat room includes features for tagging a public chat room, the tags used to integrate the public chat room into the topical hierarchy of public chat rooms. In some embodiments, the software module for allowing the user to create and enter a chat room includes features for configuring access control for a private chat room. In further embodiments, configuring access control for a private chat room requires an in-app purchase. In some embodiments, creation of a chat room requires an in-app purchase. In some embodiments, entering a chat room requires an in-app purchase. In some embodiments, the software module for allowing the user to create and enter a chat room includes features for customizing the appearance of the chat room in the user interface of the mobile application. In further embodiments, customizing the appearance of the chat room requires an in-app purchase. In some embodiments, the chat stream comprises chat messages organized chronologically. In some embodiments, the software module for browsing public chat rooms includes features for searching public chat rooms in a topical hierarchy of public chat rooms. In some embodiments, the mobile application further comprises a software module for allowing the user to navigate up and down in the topical hierarchy of public chat rooms. In some embodiments, the chat stream comprises chat messages from 2 to 100 chat rooms. In some embodiments, the mobile application further comprises a software module for allowing the user to select an anonymity setting from a plurality of anonymity settings, the selected anonymity setting determining information about the user available to other chat users. In some embodiments, the mobile application further comprises a software module for allowing the user to configure a plurality of identity profiles, an identity profile determining how the user is identified to other users in a chat room. In some embodiments, the chat messages comprise rich media. In further embodiments, the chat messages comprise photos, videos, or emoticons. In some embodiments, the server application further comprises a software module for recommending a chat room to the user, the recommendation based at least in part on activity of the chat room. In some embodiments, the server application further comprises a software module for creating a new chat room, the creation of the new chat room based at least in part on topics and activity of existing chat rooms.

In another aspect, disclosed herein are computer-implemented systems comprising: a mobile processing device comprising an operating system configured to perform executable instructions and a memory device; a mobile application including instructions executable by the mobile processing device to create a chat environment comprising: a software module for allowing a user to browse and select a public chat room, the public chat room selected from a topical hierarchy of public chat rooms; wherein if a user selects a public chat room having less than a pre-determined number of users, the user is entered into a public chat room higher in the topical hierarchy of public chat rooms and the user is notified when the selected public chat room achieves the pre-determined number of users; a software module for allowing the user to create and enter a chat room, the user designating the chat room as a public chat room or a private chat room, the chat room comprising a topic; and a software module for presenting a chat stream to the user, the chat stream comprising chat messages from one or more entered chat rooms, the chat messages chronologically organized to form the stream. In some embodiments, one or more chat rooms comprise a topic based on location. In some embodiments, the topical hierarchy of public chat rooms is filtered based on location of the user. In some embodiments, the chat environment further comprises a software module for allowing the user to view a list of public rooms entered, the list configured to allow the user to swipe to navigate between public rooms. In some embodiments, the chat environment further comprises a software module for allowing the user to view a list of private rooms entered, the list configured to allow the user to swipe to navigate between private rooms. In some embodiments, the chat environment further comprises a software module for muting and leaving each entered room. In some embodiments, the pre-determined number of users is 2 to 10 users. In other embodiments, the pre-determined number of users is 10 to 100 users. In other embodiments, the pre-determined number of users is 100 to 1000 users. In other embodiments, the pre-determined number of users is 1000 to 5000 users. In some embodiments, the software module for allowing the user to create and enter a chat room includes features for inviting other users to join a created chat room. In some embodiments, the software module for allowing the user to create and enter a chat room includes features for tagging a public chat room, the tags used to integrate the public chat room into the topical hierarchy of public chat rooms. In some embodiments, the software module for allowing the user to create and enter a chat room includes features for configuring access control for a private chat room. In further embodiments, configuring access control for a private chat room requires an in-app purchase. In some embodiments, creation of a chat room requires an in-app purchase. In some embodiments, entering a chat room requires an in-app purchase. In some embodiments, the software module for allowing the user to create and enter a chat room includes features for customizing the appearance of the chat room in the user interface of the mobile application. In further embodiments, customizing the appearance of the chat room requires an in-app purchase. In some embodiments, the software module for browsing public chat rooms includes features for searching public chat rooms in the topical hierarchy of public chat rooms. In some embodiments, the chat environment further comprises a software module for allowing the user to navigate up and down in the topical hierarchy of public chat rooms. In some embodiments, the chat stream comprises chat messages from 2 to 10 chat rooms. In other embodiments, the chat stream comprises chat messages from 10 to 100 chat rooms. In other embodiments, the chat stream comprises chat messages from 100 to 1000 chat rooms. In some embodiments, the chat environment further comprises a software module for allowing the user to select an anonymity setting from a plurality of anonymity settings, the selected anonymity setting determining information about the user available to other chat users. In some embodiments, the chat environment further comprises a software module for allowing the user to configure a plurality of identity profiles, an identity profile determining how the user is identified to other users in a chat room. In some embodiments, the chat messages comprise rich media. In further embodiments, the chat messages comprise photos, videos, or emoticons. In some embodiments, the chat environment further comprises a software module for recommending a chat room to the user, the recommendation based at least in part on activity of the chat room. In some embodiments, the chat environment further comprises a software module for creating a new chat room, the creation of the new chat room based at least in part on topics and activity of existing chat rooms.

In another aspect, disclosed herein are non-transitory computer-readable storage media encoded with a mobile application including instructions executable by a processor to create a chat environment comprising: a software module for allowing a user to browse and select a public chat room, the public chat room selected from a topical hierarchy of public chat rooms; wherein if a user selects a public chat room having less than a pre-determined number of users, the user is entered into a public chat room higher in the topical hierarchy of public chat rooms and the user is notified when the selected public chat room achieves the pre-determined number of users; a software module for allowing the user to create and enter a chat room, the user designating the chat room as a public chat room or a private chat room, the chat room comprising a topic; and a software module for presenting a chat stream to the user, the chat stream comprising chat messages from one or more entered chat rooms, the chat messages chronologically organized to form the stream. In some embodiments, one or more chat rooms comprise a topic based on location. In some embodiments, the topical hierarchy of public chat rooms is filtered based on location of the user. In some embodiments, the chat environment further comprises a software module for allowing the user to view a list of public rooms entered, the list configured to allow the user to swipe to navigate between public rooms. In some embodiments, the chat environment further comprises a software module for allowing the user to view a list of private rooms entered, the list configured to allow the user to swipe to navigate between private rooms. In some embodiments, the chat environment further comprises a software module for muting and leaving each entered room. In some embodiments, the pre-determined number of users is 2 to 10 users. In other embodiments, the pre-determined number of users is 10 to 100 users. In other embodiments, the pre-determined number of users is 100 to 1000 users. In other embodiments, the pre-determined number of users is 1000 to 5000 users. In some embodiments, the software module for allowing the user to create and enter a chat room includes features for inviting other users to join a created chat room. In some embodiments, the software module for allowing the user to create and enter a chat room includes features for tagging a public chat room, the tags used to integrate the public chat room into the topical hierarchy of public chat rooms. In some embodiments, the software module for allowing the user to create and enter a chat room includes features for configuring access control for a private chat room. In further embodiments, configuring access control for a private chat room requires an in-app purchase. In some embodiments, creation of a chat room requires an in-app purchase. In some embodiments, entering a chat room requires an in-app purchase. In some embodiments, the software module for allowing the user to create and enter a chat room includes features for customizing the appearance of the chat room in the user interface of the mobile application. In further embodiments, customizing the appearance of the chat room requires an in-app purchase. In some embodiments, the software module for browsing public chat rooms includes features for searching public chat rooms in the topical hierarchy of public chat rooms. In some embodiments, the chat environment further comprises a software module for allowing the user to navigate up and down in the topical hierarchy of public chat rooms. In some embodiments, the chat stream comprises chat messages from 2 to 10 chat rooms. In other embodiments, the chat stream comprises chat messages from 10 to 100 chat rooms. In other embodiments, the chat stream comprises chat messages from 100 to 1000 chat rooms. In some embodiments, the chat environment further comprises a software module for allowing the user to select an anonymity setting from a plurality of anonymity settings, the selected anonymity setting determining information about the user available to other chat users. In some embodiments, the chat environment further comprises a software module for allowing the user to configure a plurality of identity profiles, an identity profile determining how the user is identified to other users in a chat room. In some embodiments, the chat messages comprise rich media. In further embodiments, the chat messages comprise photos, videos, or emoticons. In some embodiments, the chat environment further comprises a software module for recommending a chat room to the user, the recommendation based at least in part on activity of the chat room. In some embodiments, the chat environment further comprises a software module for creating a new chat room, the creation of the new chat room based at least in part on topics and activity of existing chat rooms.

In another aspect, disclosed herein are methods comprising: maintaining, at a computer, a database of public chat rooms and private chat rooms, each chat room comprising a topic, the public chat rooms organized into a hierarchy of public chat rooms; providing, by the computer, a user interface for browsing and selecting a public chat room, the public chat room selected from a topical hierarchy of public chat rooms; providing, by the computer a user interface for creating and entering a chat room, the chat room a public chat room or a private chat room; receiving, at the computer, a request from a user to enter a selected public chat room and in response to the request: entering the user into the selected public chat room where the selected public chat room has a pre-determined number of users; or entering the user into a public chat room higher in the topical hierarchy of public chat rooms where the selected public chat room has less than the pre-determined number of users; transmitting, by the computer, a notification to the user when the selected public chat room meets the pre-determined number of users; consolidating, by the computer, chat messages from one or more chat rooms entered by the user to form a chat stream for the user; and presenting, by the computer, the chat stream to the user, the chat stream comprising chat messages from one or more entered chat rooms, the chat messages organized to form the stream.

DETAILED DESCRIPTION OF THE INVENTION

Figure 1:
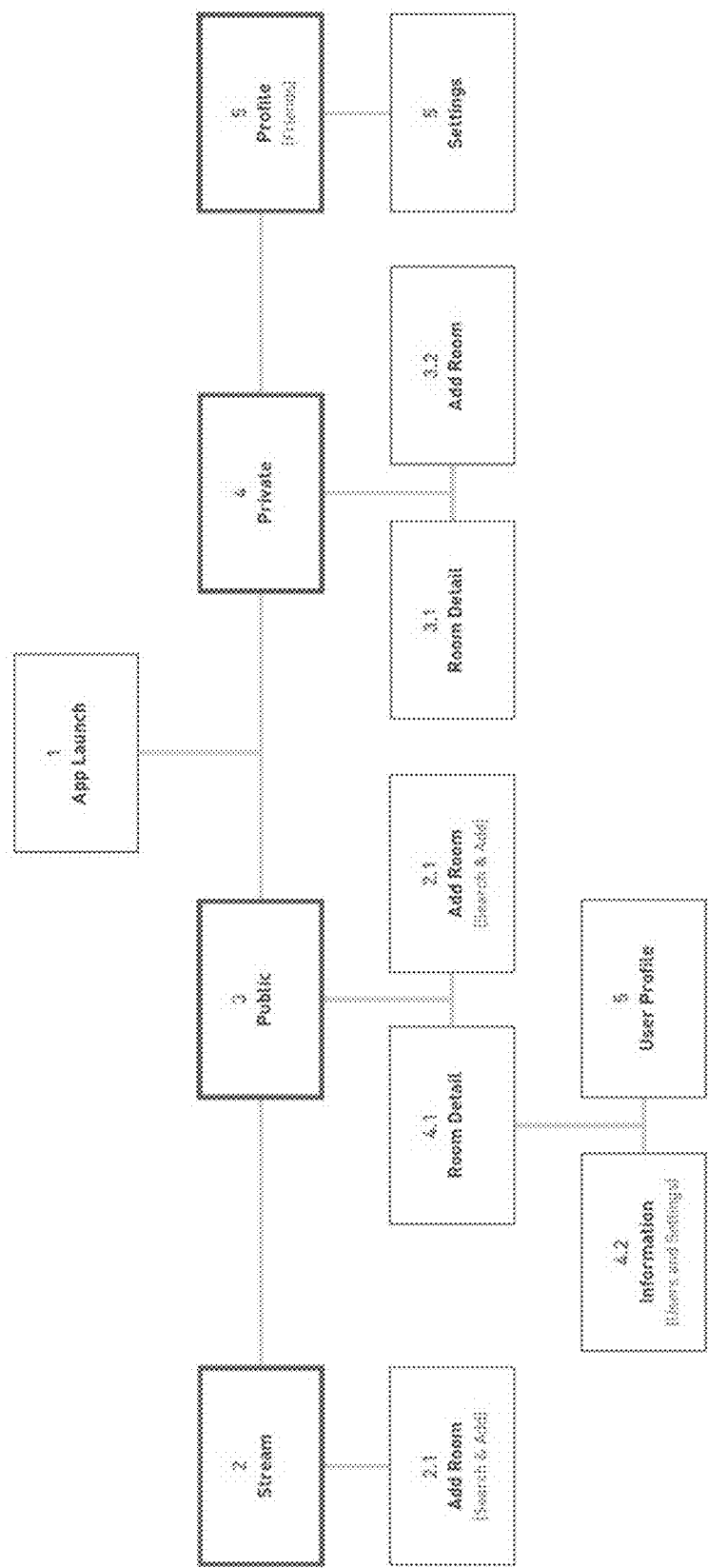
FIG. 1 shows a non-limiting example of a block diagram depicting a high level application structure for a chat application described herein; in this case, a diagram depicting an application including public and private chat rooms, a multi-room chat stream, and a user profile.

Described herein, in certain embodiments, are chat platforms comprising: a plurality of mobile processors each configured to provide a mobile application comprising: a software module for allowing a user to browse and select a public chat room, the public chat room selected from a topical hierarchy of public chat rooms; a software module for allowing the user to create and enter a chat room, the chat room a public chat room or a private chat room; and a software module for presenting a chat stream to the user, the chat stream comprising chat messages from one or more entered chat rooms, the chat messages organized to form the stream; a server processor configured to provide a server application comprising: a database of public chat rooms and private chat rooms, each chat room comprising a topic, the public chat rooms organized into a hierarchy of public chat rooms; a software module for receiving a request from the user to enter a selected public chat room and in response to the request: entering the user into the selected public chat room where the selected public chat room has a pre-determined number of users; or entering the user into a public chat room higher in the topical hierarchy of public chat rooms where the selected public chat room has less than the pre-determined number of users; a software module for transmitting a notification to the user when the selected public chat room meets the pre-determined number of users; and a software module for consolidating chat messages from one or more chat rooms entered by the user to form a chat stream for the user.

Also described herein, in certain embodiments, are computer-implemented systems comprising: a mobile processing device comprising an operating system configured to perform executable instructions and a memory device; a mobile application including instructions executable by the mobile processing device to create a chat environment comprising: a software module for allowing a user to browse and select a public chat room, the public chat room selected from a topical hierarchy of public chat rooms; wherein if a user selects a public chat room having less than a pre-determined number of users, the user is entered into a public chat room higher in the topical hierarchy of public chat rooms and the user is notified when the selected public chat room achieves the pre-determined number of users; a software module for allowing the user to create and enter a chat room, the user designating the chat room as a public chat room or a private chat room, the chat room comprising a topic; and a software module for presenting a chat stream to the user, the chat stream comprising chat messages from one or more entered chat rooms, the chat messages chronologically organized to form the stream.

Also described herein, in certain embodiments, are non-transitory computer-readable storage media encoded with a mobile application including instructions executable by a processor to create a chat environment comprising: a software module for allowing a user to browse and select a public chat room, the public chat room selected from a topical hierarchy of public chat rooms; wherein if a user selects a public chat room having less than a pre-determined number of users, the user is entered into a public chat room higher in the topical hierarchy of public chat rooms and the user is notified when the selected public chat room achieves the pre-determined number of users; a software module for allowing the user to create and enter a chat room, the user designating the chat room as a public chat room or a private chat room, the chat room comprising a topic; and a software module for presenting a chat stream to the user, the chat stream comprising chat messages from one or more entered chat rooms, the chat messages chronologically organized to form the stream.

Also described herein, in certain embodiments, are methods comprising: maintaining, at a computer, a database of public chat rooms and private chat rooms, each chat room comprising a topic, the public chat rooms organized into a hierarchy of public chat rooms; providing, by the computer, a user interface for browsing and selecting a public chat room, the public chat room selected from a topical hierarchy of public chat rooms; providing, by the computer a user interface for creating and entering a chat room, the chat room a public chat room or a private chat room; receiving, at the computer, a request from a user to enter a selected public chat room and in response to the request: entering the user into the selected public chat room where the selected public chat room has a pre-determined number of users; or entering the user into a public chat room higher in the topical hierarchy of public chat rooms where the selected public chat room has less than the pre-determined number of users; transmitting, by the computer, a notification to the user when the selected public chat room meets the pre-determined number of users; consolidating, by the computer, chat messages from one or more chat rooms entered by the user to form a chat stream for the user; and presenting, by the computer, the chat stream to the user, the chat stream comprising chat messages from one or more entered chat rooms, the chat messages organized to form the stream.

CERTAIN DEFINITIONS

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.
Platform In some embodiments, the chat platforms described herein include a plurality of mobile chat applications and one or more chat server applications. The platform supports any suitable number of users connected via mobile chat application. For example, in various embodiments, the platform supports at least about $10^1$, $10^2$, $10^3$, $10^4$, $10^5$, $10^6$, $10^7$, $10^8$, $10^9$, or more users simultaneously. By way of further example, in various embodiments, suitable chat server configurations include 1, 2, 3, 4, 5, 6, 7, 8, 9, 10, 20, 30, 40, 50, 60, 70, 80, 90, 100 or more servers, one or more server farms, and cloud-based server resource allocation systems.

Referring to FIG. 1, in a particular embodiment, a mobile chat application described herein is installed on a mobile device and launched. In this embodiment, the landing screen is a chat stream described herein. Further in this embodiment, other navigable screens include a list of current public chat rooms, a list of current private chat rooms, and a user profile. From the chat stream screen, users optionally search for rooms and add new rooms to their stream. From both the public and private chat room lists, users optionally view room details and add new rooms. From the user profile, users optionally configure user settings.

Figure 14:
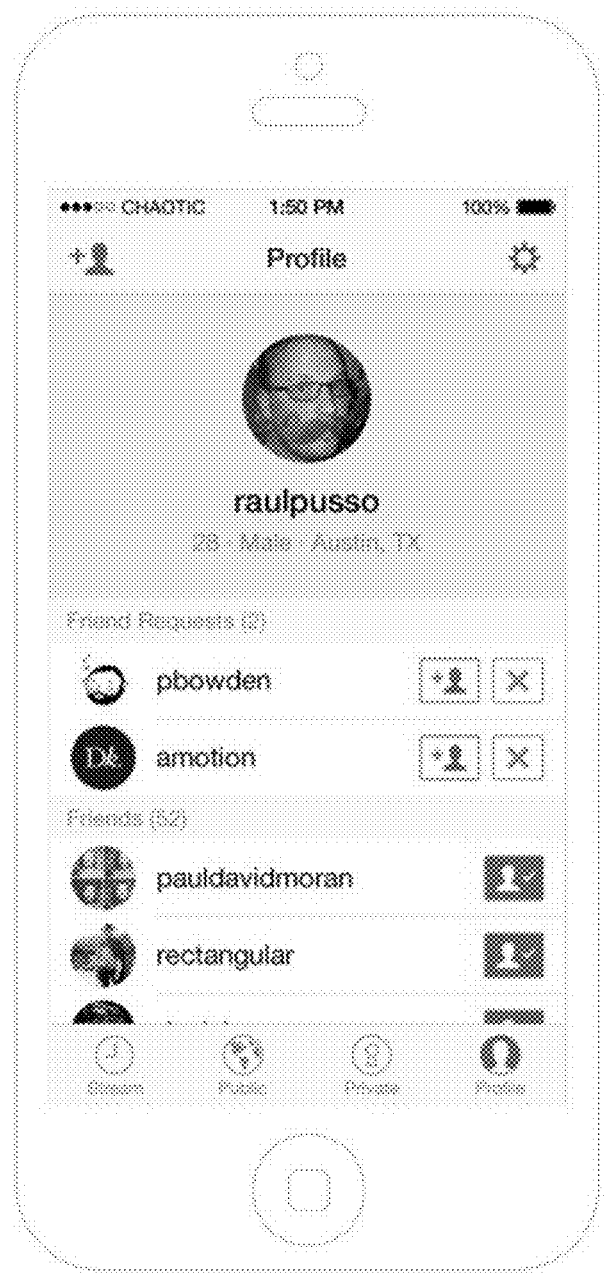
FIG. 14 shows a non-limiting example of a user profile for a chat application; in this case, a user profile including personal information (e.g., age, gender, location, etc.), friends, and friend requests.

Referring to FIG. 14, in a particular embodiment, a chat application described herein includes a user profile for configuring personal information (e.g., age, gender, location, etc.), friends, and friend requests. In some embodiments, a user profile includes features to access an interface for configuring user settings and an interface for finding friends.

In some embodiments, a user has one user profile in the chat application. In other embodiments, a user has a plurality of profiles. In further embodiments, a user optionally configures multiple identities for use in chatting and optionally switches between identities at will. In such embodiments, any suitable number of identities/profiles are created including, by way of non-limiting examples, 2, 3, 4, 5, 6, 7, 8, 9, 10, 11, 12, 13, 14, 15, 16, 17, 18, 19, 20 or more identities/profiles. For example, a user optionally uses a public profile in public chat rooms and an alternative private profile in private chat rooms.

In some embodiments, the platforms, systems, media, and methods described herein include features for allowing a user to configure variable levels (e.g., gradients) of anonymity. For example, a user optionally configures the application to present them as anonymous other users when they first begin using the application and reveal more personal information based on, for example, time, activity, chat topics, chat rooms, receiving users, and the like. In further embodiments, levels of anonymity include: anonymous, basic details (e.g., age, gender, general location, etc.), advanced details (e.g., interests, education, specific location, etc.), full disclosure of all details, and the like.

In some embodiments, the platforms, systems, media, and methods described herein include features for allowing exchange of personal information between two or more users. For example, in a system providing for variable levels of anonymity two users may want to simultaneously exchange a pre-determined level of user profile detail to each other. In other words, such a system provides an escrow service for equitable revelation of user profile information.

Figure 15:
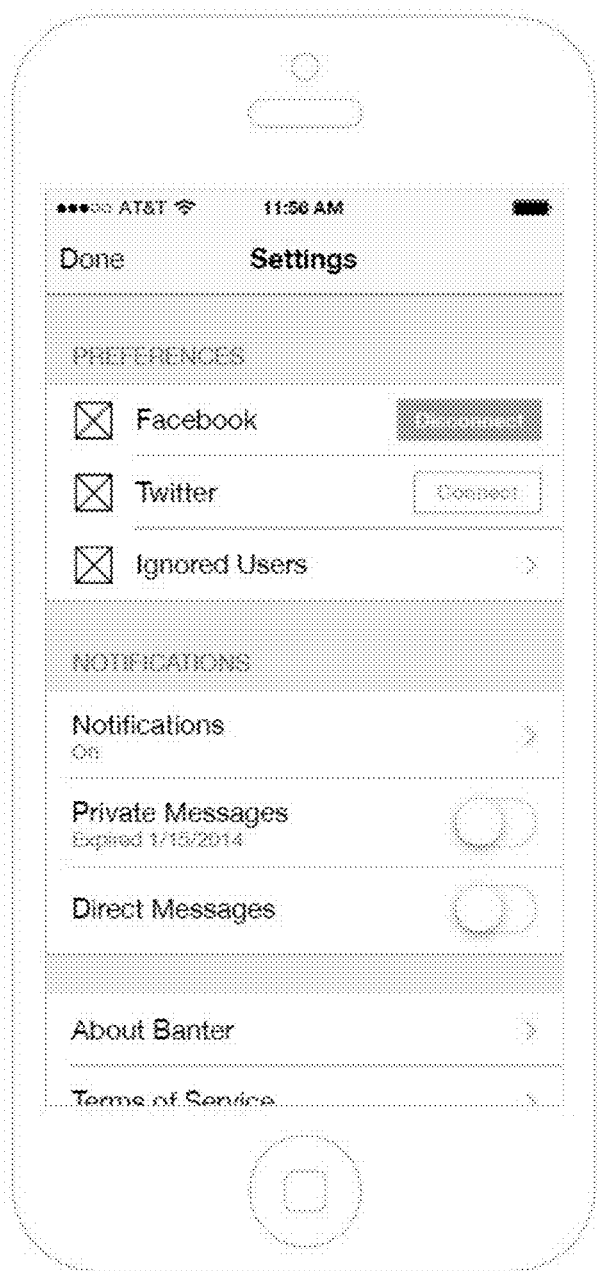
FIG. 15 shows a non-limiting example of a user settings interface for a chat application; in this case, an interface including settings for configuring Facebook and Twitter integration, managing an ignored users list, and notifications.

Referring to FIG. 15, in a particular embodiment, a chat application described herein includes a user settings interface for configuring Facebook and Twitter integration, managing an ignored users list, managing notifications, managing private messages, managing direct messages, and the like.

Figure 16:
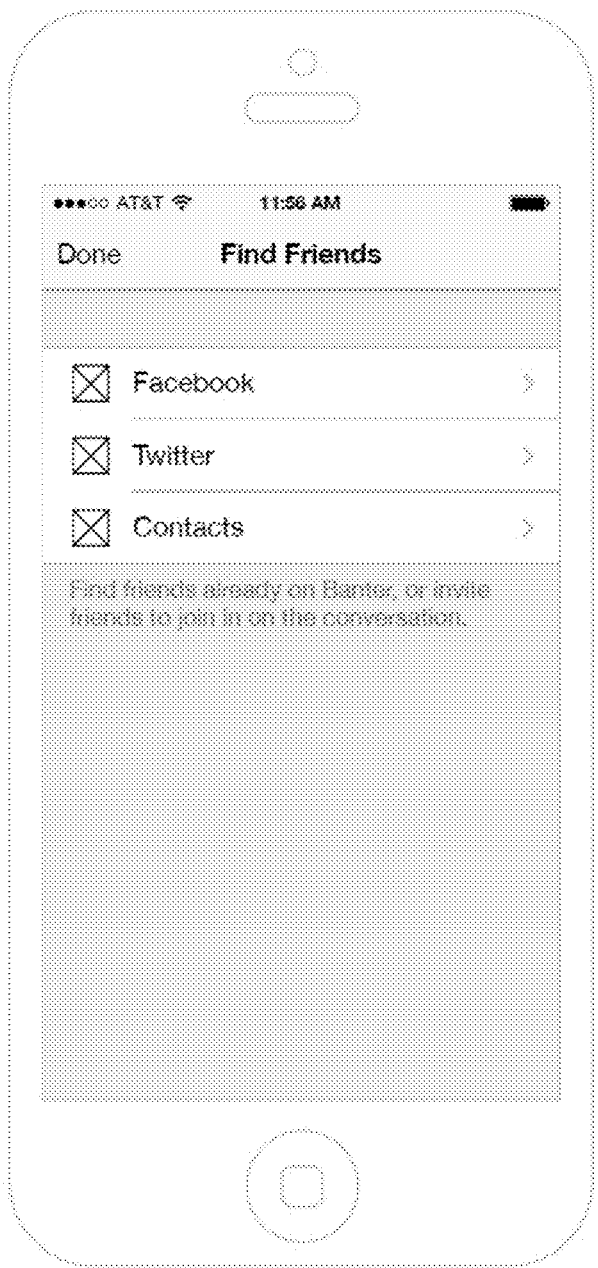
FIG. 16 shows a non-limiting example of an interface for finding friends in a chat application; in this case, an interface allowing a user to configure methods of finding other users who use the chat room application or inviting other users to use the application.

Referring to FIG. 16, in a particular embodiment, a chat application described herein includes an interface for finding friends that allows a user to configure methods of finding other users who use the chat room application or inviting other users to use the application. In this embodiment, the optional methods include integration with Facebook, Twitter, a contacts list, and the like to find friends using the chat application and/or invite friends to use the chat application.
Public Chat Rooms In some embodiments, the platforms, systems, media, and methods described herein include a public chat rooms, or use of the same. In further embodiments, public chat rooms are open to any user so long as maximum occupancy standards, and other restrictions, are met.

Figure 5:
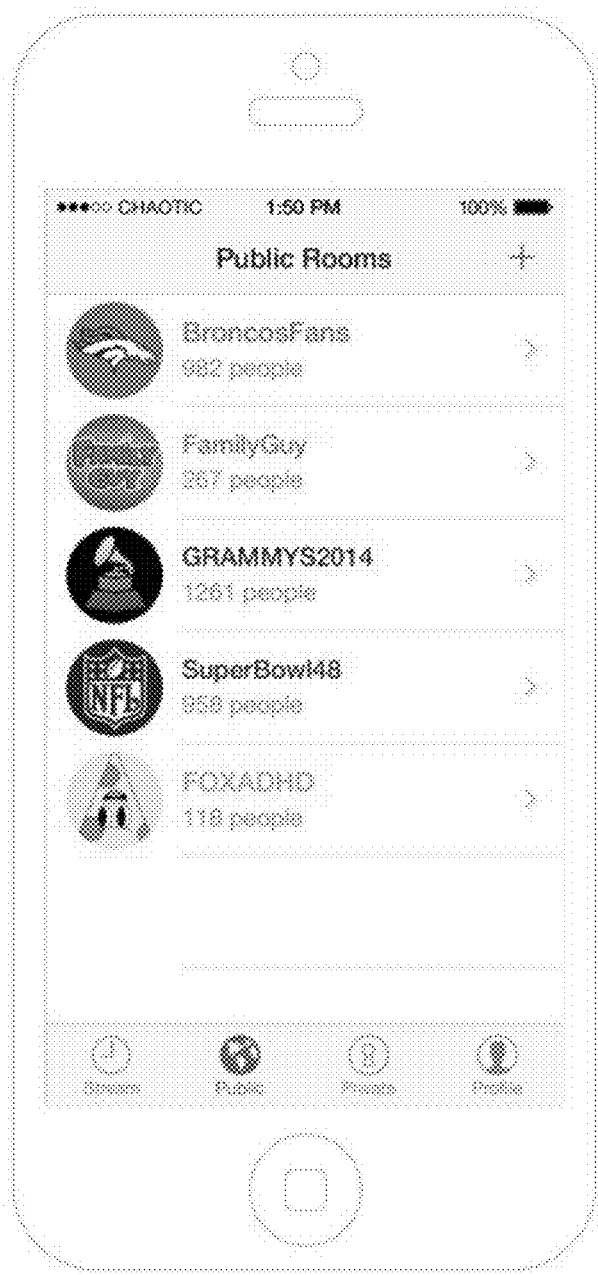
FIG. 5 shows a non-limiting example of an interface for viewing a list of public chat rooms a user is in; in this case, an interface allowing a user to enter new public chat rooms and allowing the user to navigate between entered public chat rooms.

Referring to FIG. 5, in a particular embodiment, a chat application described herein includes an interface for viewing a list of public chat rooms a user has entered. In this embodiment, the interface allows a user to browse or search for new public chat rooms (by tapping on the + icon). Further in this embodiment, the interface allows the user to quickly navigate between entered public chat rooms. In this exemplary embodiment, a navigation bar at the bottom of the interface provides access to a chat stream, a list of public chat rooms a user has entered, a list of private chat rooms a user has entered, and the user's profile(s) in the application.

Figure 6A:
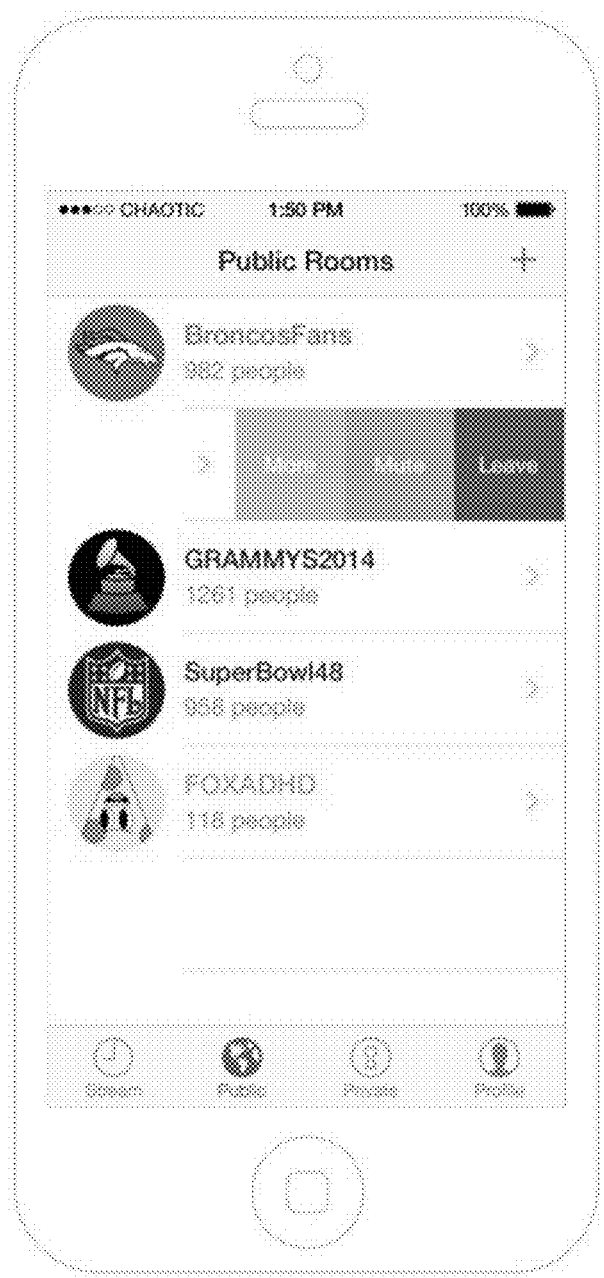
FIG. 6a shows a non-limiting example of an interface for viewing a list of public chat rooms a user has entered; in this case, an interface providing the user with an option, for each public chat room in the list, to leave the room, mute the room, or access additional functionality for the room.

Referring to FIG. 6a, in a particular embodiment, a chat application described herein allows a user to swipe to access chat room actions for each public chat room in the list depicted in FIG. 5. In this embodiment, chat room actions include leaving the room (removing the room from the list), muting the room, or accessing additional functionality for the room. In further embodiments, accessing public chat room actions generates confirmation screens as depicted in FIGS. 6b, 6c, and 6d.

Figure 6B:
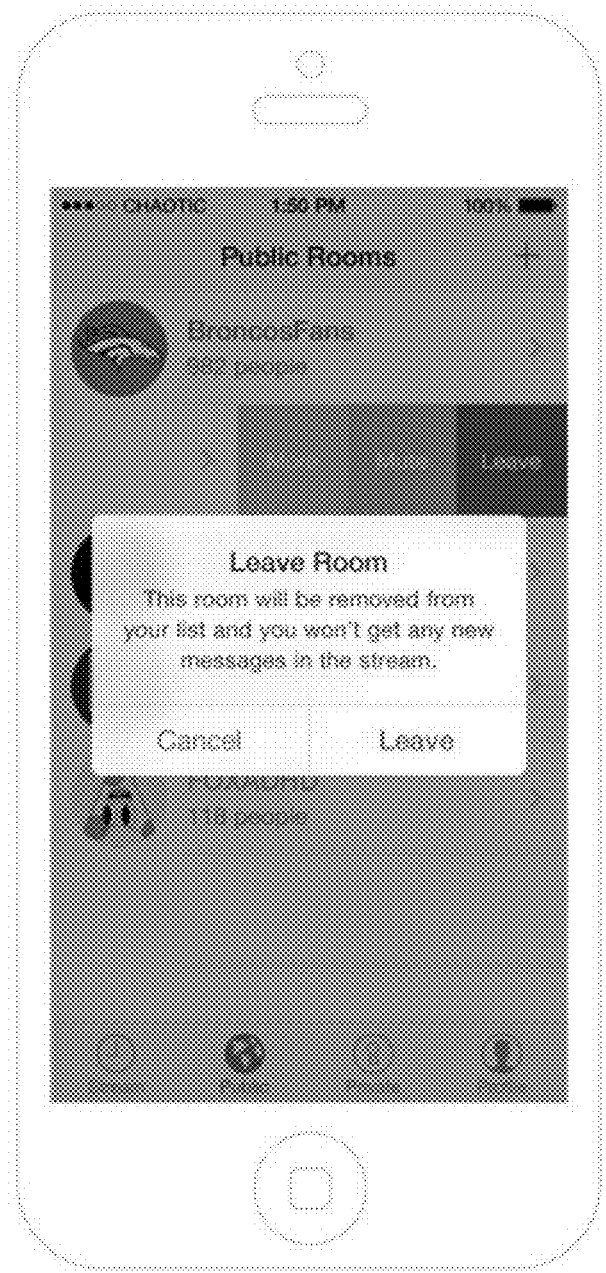
FIG. 6b shows a non-limiting example of an interface for viewing a list of public chat rooms a user is in; in this case, an interface confirming the user's decision to leave a selected chat room and informing user that they will no longer receive any further messages from the chat room.
Figure 6C:
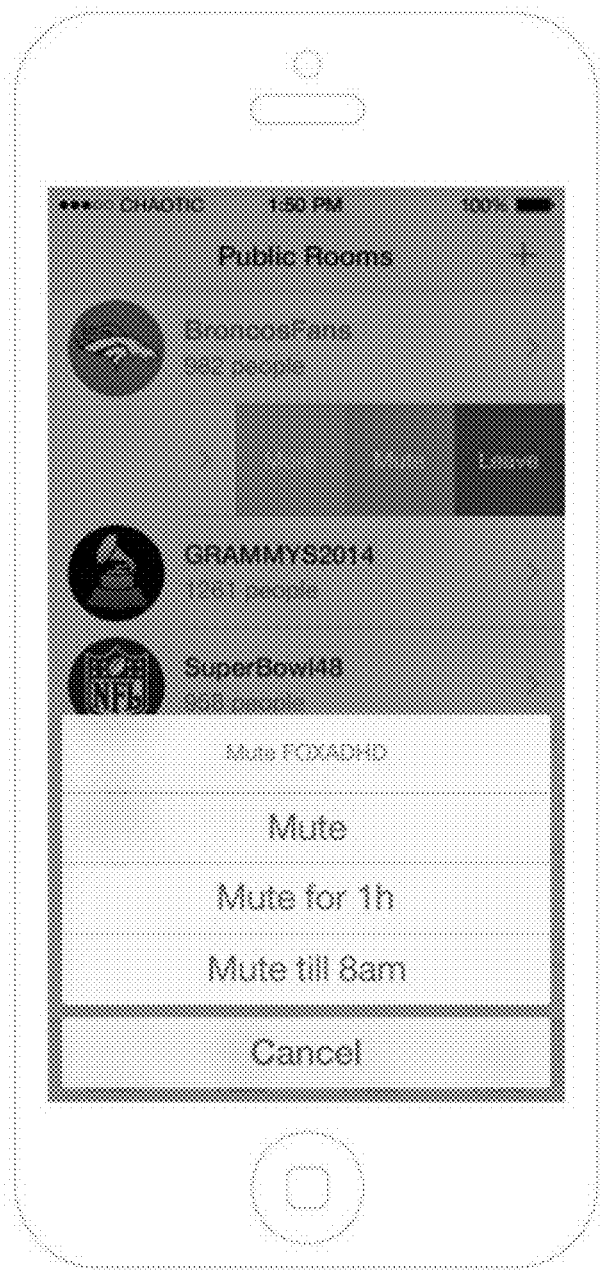
FIG. 6c shows a non-limiting example of an interface for viewing a list of public chat rooms a user is in; in this case, an interface providing the user with an option, for each public chat room in the list, to mute the public chat room for one hour, until the next day, or indefinitely.
Figure 6D:
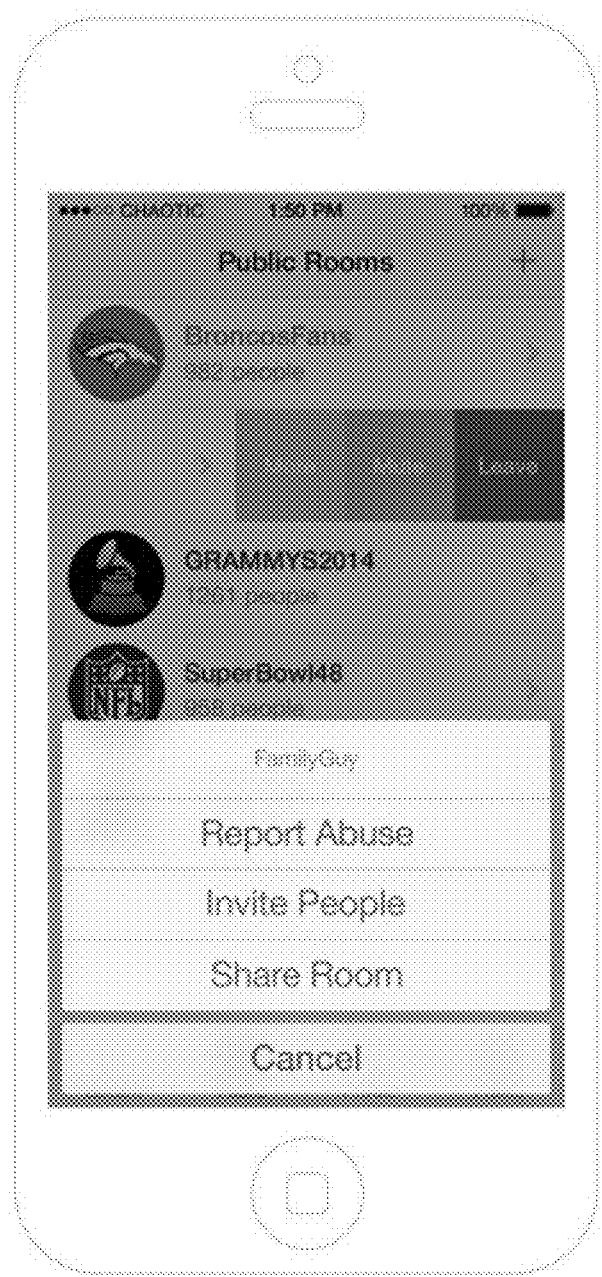
FIG. 6d shows a non-limiting example of an interface for viewing a list of public chat rooms a user is in; in this case, an interface providing the user with the option, for each public chat room in the list, to report abuse, invite people, or share the room with other users.

Referring to FIGS. 6b, 6c, and 6d, in particular embodiments, a chat application described herein provides confirmation screens for public chat room actions. In these embodiments, where a user indicates that they want to leave a public chat room, the confirmation includes "cancel" and "leave" options. Where a user indicates that they want to mute a public chat room, the confirmation includes "mute," "mute for one hour," and "mute until 8 am" options. Where a user indicates that they want to access additional actions for a public chat room, the confirmation includes "report abuse," "invite people," and "share room" options.

Figure 7:
FIG. 7 shows a non-limiting example of an interface for viewing a public chat room; in this case, a user is in hypothetical chat room "SuperBowl48" where the user is able to monitor and participate the conversation within the "SuperBowl48" chat room.

Referring to FIG. 7, in a particular embodiment, a chat application described herein includes an interface for viewing a public chat room. In this embodiment, the name of the public chat room "SuperBowl48" is displayed at the top of the screen along with the number of users in parenthesis. Further in this embodiment, the chat messages for the room are displayed and the user is able to monitor and participate in the conversation within the "SuperBowl48" chat room. In this exemplary embodiment, a text field and send button as well as features for capturing photos/videos and adding emoticons to chat messages are depicted at the bottom of the interface and allow the user to send messages to the public chat room. Further in this embodiment, the interface allows the user to quickly navigate between entered public chat rooms by swiping.

Figure 8:
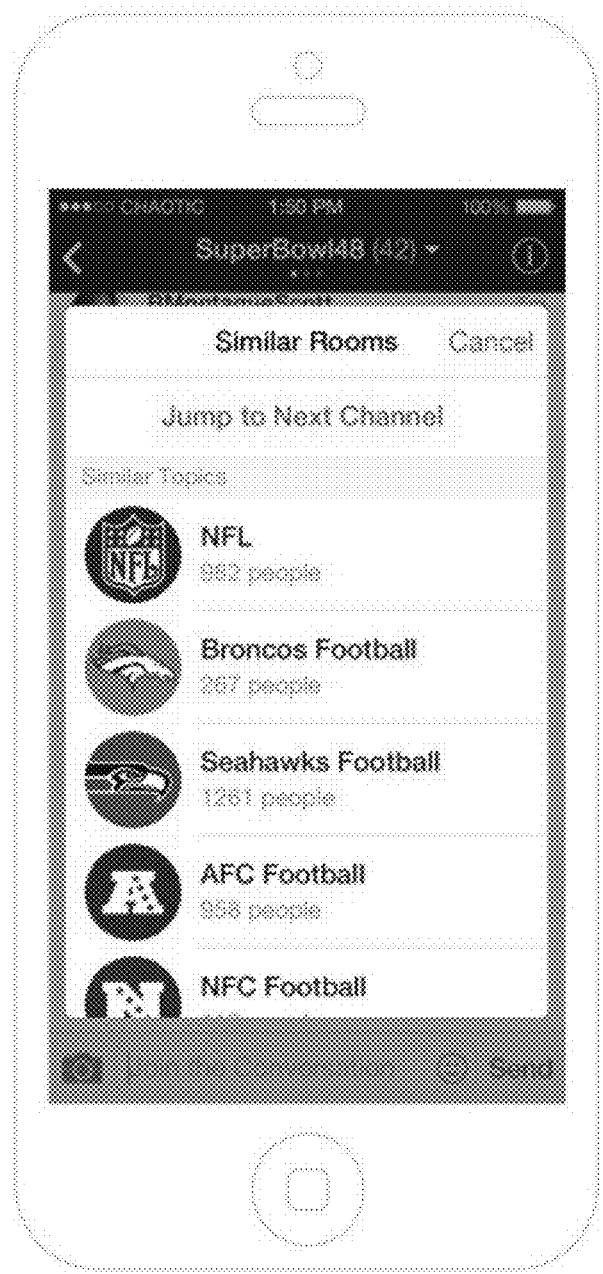
FIG. 8 shows a non-limiting example of an interface for navigating to other similar public chat rooms; in this case, an interface allowing the user to browse similar topics of interest, where the results are presented in topical hierarchy of relevant public chat rooms.

Referring to FIG. 8, in a particular embodiment, a chat application described herein includes an interface for navigating to other similar public chat rooms. In this embodiment, tapping on the room name depicted in FIG. 7 allows the user to browse similar topics of interest, where the results are optionally from topics above and/or below the current topic in the hierarchy. This exemplary interface allows the user to navigate horizontally and vertically with the hierarchy of chat topics.

Figure 9:
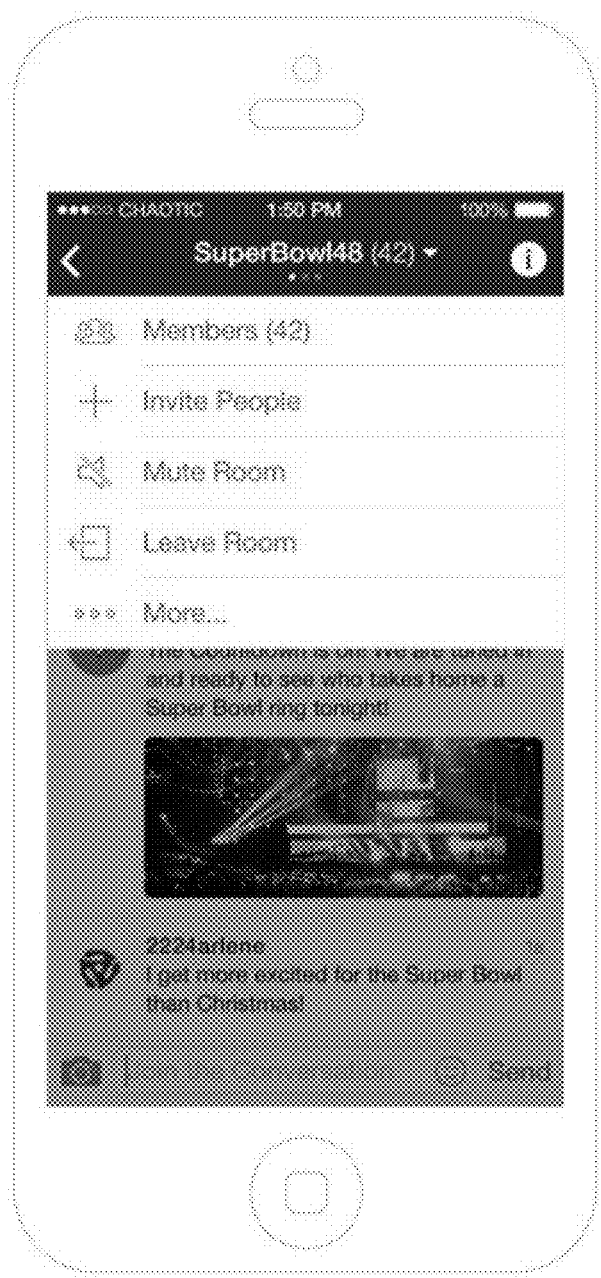
FIG. 9 shows a non-limiting example of an interface for accessing room actions for a public chat room; in this case, an interface providing the user with the option to invite people, mute the room, leave the room, and access other public chat room actions.

Referring to FIG. 9, in a particular embodiment, a chat application described herein includes an interface for accessing room actions for a public chat room. In this embodiment, tapping on the info icon depicted in FIG. 7 allows the user to access room actions including the option to invite people, mute the room, leave the room, and access other public chat room actions.

Figure 10A:
FIG. 10a shows a non-limiting example of an interface for browsing public chat room topics; in this case, an interface allowing a user to browse a list of favorites and a list of categories of topics.
Figure 10B:
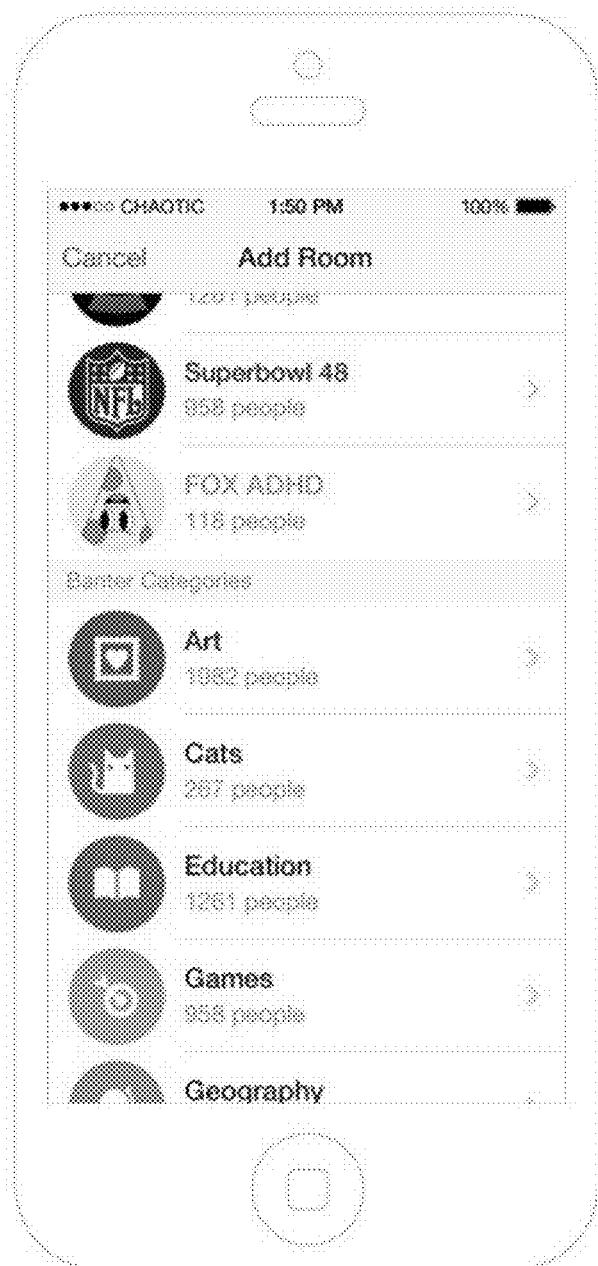
FIG. 10b shows a non-limiting example of an interface for browsing public chat room topics; in this case, an interface allowing a user to browse categories of public chat rooms via a topical hierarchy.

Referring to FIGS. 10a and 10b, in a particular embodiment, a chat application described herein includes an interface for browsing public chat room topics. In this embodiment, tapping the + icon depicted in FIG. 5 allows the user to browse a list of favorite topics (e.g., "Banter Favorites") and a hierarchical graph of topics and sub-topics (e.g., "Banter Categories"). The interface for browsing public chat room topics also includes a feature for allowing the user to search for chat room topics by keyword and the like.

Figure 10C:
FIG. 10c shows a non-limiting example of an interface for browsing public chat room topics; in this case, an interface allowing a user to browse sub-categories within a music category.
Figure 17:
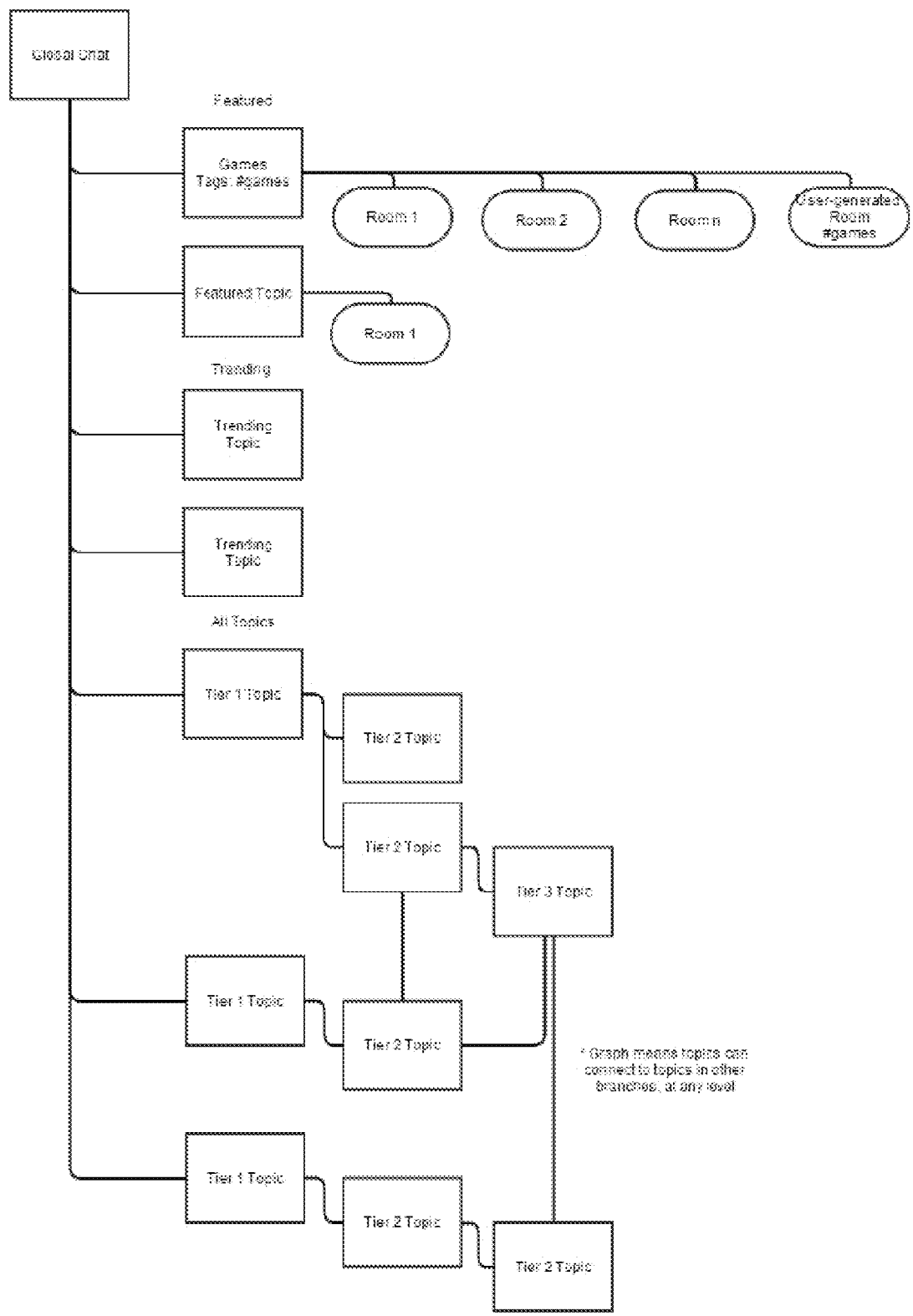
FIG. 17 shows a non-limiting example of a block diagram depicting a topical hierarchy of chat rooms; in this case, a hierarchy of public chat rooms organized by featured topics, trending topics, and all topics.

Referring to FIG. 10c, in a particular embodiment, the interface for browsing public chat room topics depicted in FIGS. 10a and 10b allows a user to browse a list of sub-categories (e.g., second tier topics) within a music category (e.g., a first tier topic). In some embodiments, the user optionally browses third, fourth, and subsequent tiers of sub-categories. An exemplary multi-tier hierarchy of chat topics is depicted in FIG. 17.

Private Chat Rooms

In some embodiments, the platforms, systems, media, and methods described herein include a private chat rooms, or use of the same. In further embodiments, private chat rooms have restricted availability. In various embodiments, private chat rooms are available to a particular type or class of users, a list of invited users, and the like. In some embodiments, availability of the private chat room is configured by a user creating the private chat room. In a particular embodiment, private chat rooms are available to friends of a user creating the private chat room.

Figure 11:
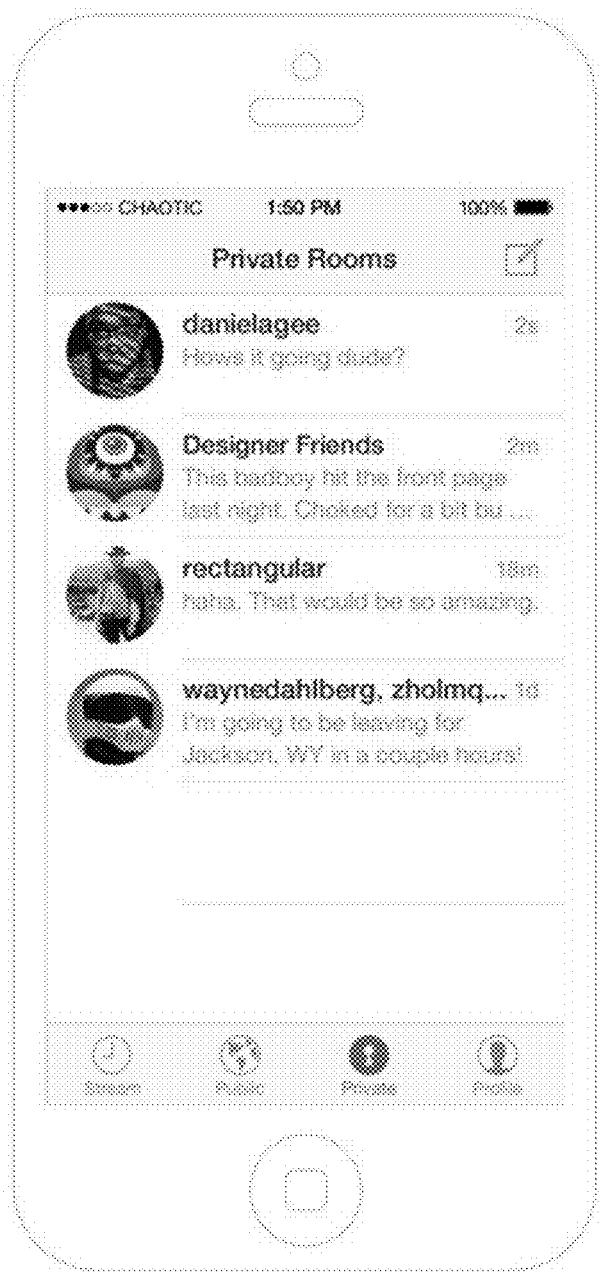
FIG. 11 shows a non-limiting example of an interface for viewing a list of private chat rooms a user is in; in this case, an interface allowing the user to create new private chat rooms and allowing the user to navigate between entered private chat rooms.

Referring to FIG. 11, in a particular embodiment, a chat application described herein includes a list of private chat rooms a user has entered. In this embodiment, the interface allows the user to create new private chat rooms (by tapping on the compose icon). Further in this embodiment, the interface allows the user to quickly navigate between entered private chat rooms. In this exemplary embodiment, a navigation bar at the bottom of the interface provides access to a chat stream, a list of public chat rooms a user has entered, a list of private chat rooms a user has entered, and the user's profile(s) in the application.

Figure 12:
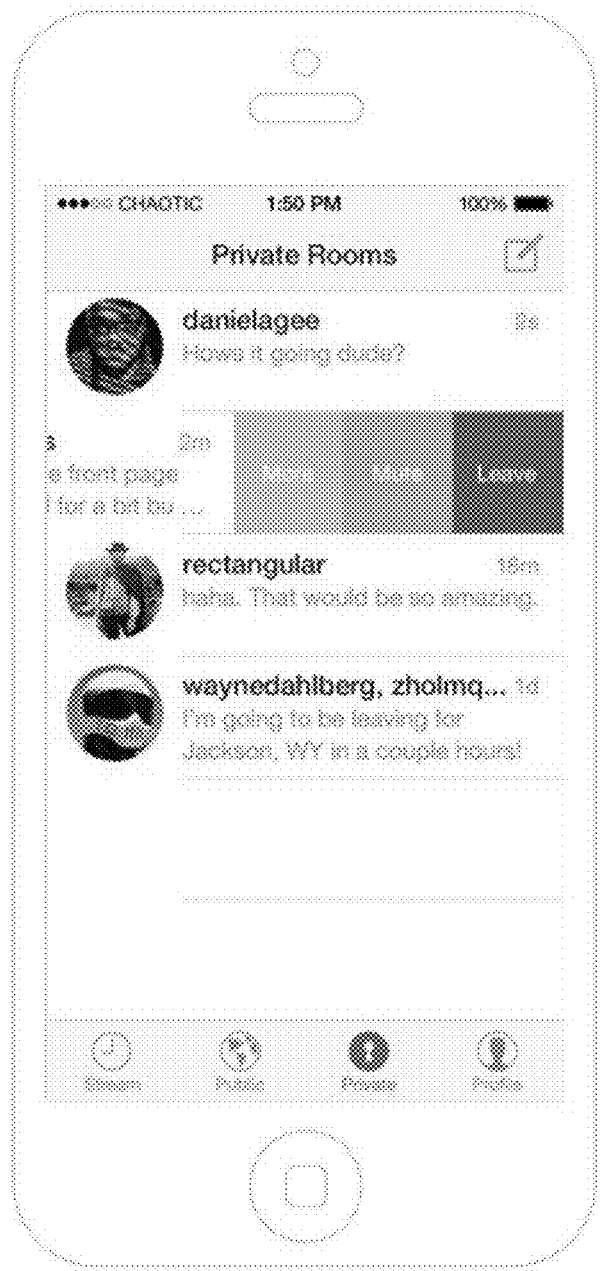
FIG. 12 shows a non-limiting example of an interface for viewing a list of private chat rooms a user is in; in this case, an interface allowing the user, for each private chat room in the list, to access private chat room actions, such as the ability to leave, mute, and access additional private chat room actions.

Referring to FIG. 12, in a particular embodiment, a chat application described herein allows a user to swipe to access room actions for each private chat room in the list depicted in FIG. 11. In this embodiment, room actions include leaving the room (removing the room from the list), muting the room, or accessing additional functionality for the room. In some embodiments, the chat room actions are accessed by swiping on a room from the public chat room list depicted in FIG. 11. The private chat room actions are generally the same as those offered for public chat rooms.

Figure 13:
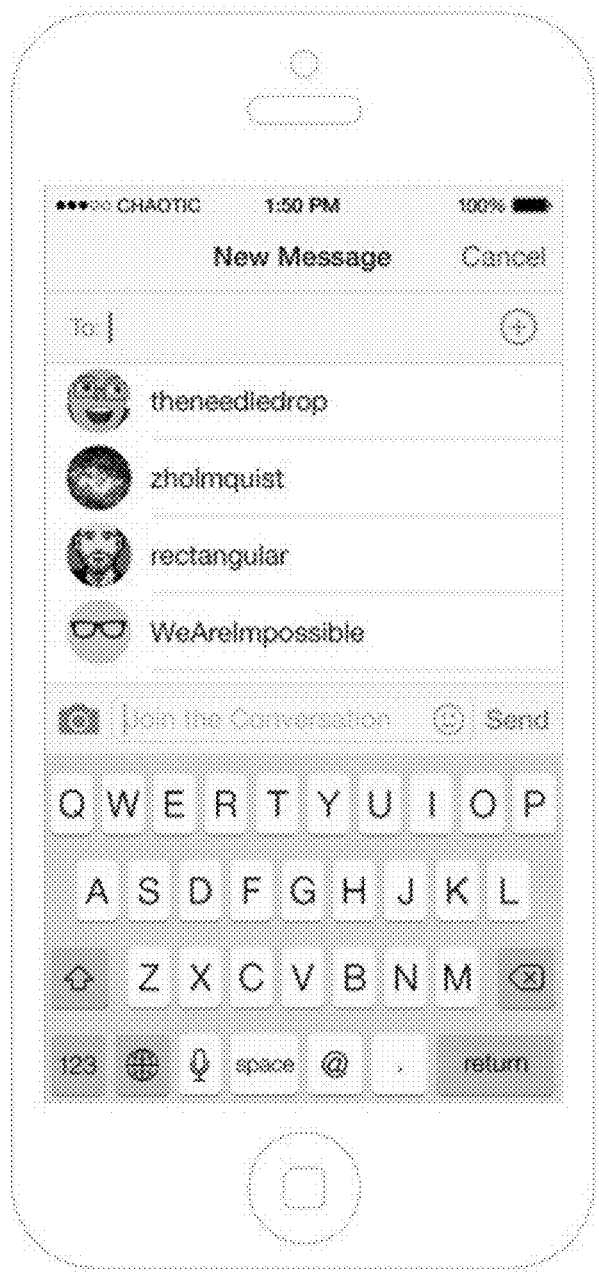
FIG. 13 shows a non-limiting example of an interface for creating a new message in a private chat room; in this case, an interface allowing a user to address the message to other users by typing usernames or accessing a list of friends (e.g., contacts, etc.) generated by a standard contacts list.

Referring to FIG. 13, in a particular embodiment, a chat application described herein includes an interface for creating a new private chat room. In this embodiment, the interface for creating a new private chat room is accessed by tapping a compose icon depicted in FIG. 11. Further in this embodiment, the interface allows the user to type a chat message and address the message to other users by typing usernames or accessing a list of friends (e.g., contacts, etc.) generated by a standard contacts list.

Chat Stream

In some embodiments, the platforms, systems, media, and methods described herein include a chat stream, or use of the same. In further embodiments, a chat stream comprises updates from entered chat rooms. In still further embodiments, a chat stream comprises updates from all public and private chat rooms a user is currently in. In various embodiments, the updates comprise, chat messages sent to public chat rooms, chat messages sent to private chat rooms, notifications from the system, direct messages from 1-on-1 conversations with other users, including combinations thereof. In some embodiments, updates slide into the chat stream from the bottom of the interface. In some embodiments, a user tapping on a chat room in the chat stream navigates to a chat room detail screen for the room. In further embodiments, tapping again will navigate back to the chat stream.

Figure 2:
FIG. 2 shows a non-limiting example of an interface for a multi-room chat stream; in this case, an interface allowing a user to monitor chat messages from public and private chat rooms the user is in and participate in the conversations in any of the chat rooms.

Referring to FIG. 2, in a particular embodiment, a chat application described herein includes an interface for presenting a chat stream comprising messages from one or more chat rooms. The interface allows a user to effectively monitor chat messages from multiple sources simultaneously. The interface also allows the user to effectively participate in the conversations in a plurality of chat rooms simultaneously. In a particular embodiment, the chat stream interface is the landing page for application start up.

Figure 3A:
FIG. 3a shows a non-limiting example of an interface for chat stream; in this case, an interface providing a user the option, for each chat room in the stream, to leave the chat room, mute the chat room, or view the room details.

Referring to FIG. 3a, in a particular embodiment, a chat application described herein allows a user to swipe to access room actions for each chat room in the stream depicted in FIG. 2. In this embodiment, room actions include leaving the room (removing the room from the stream), muting the room, or accessing additional functionality for the room. In further embodiments, accessing chat room actions generates confirmation screens as depicted in FIGS. 3b, 3c, and 3d.

Figure 3B:
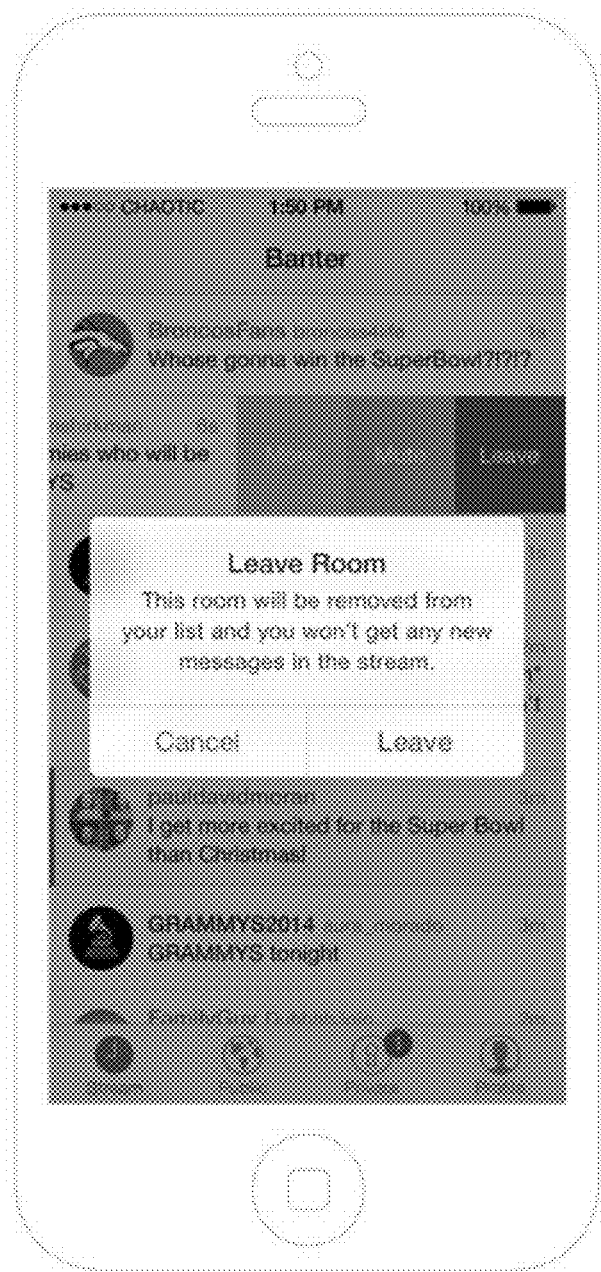
FIG. 3b shows a non-limiting example of an interface for chat stream; in this case, an interface confirming a user's decision to leave a selected chat room, and informing user that the chat room selected to be removed will no longer be in the user's chat stream.
Figure 3C:
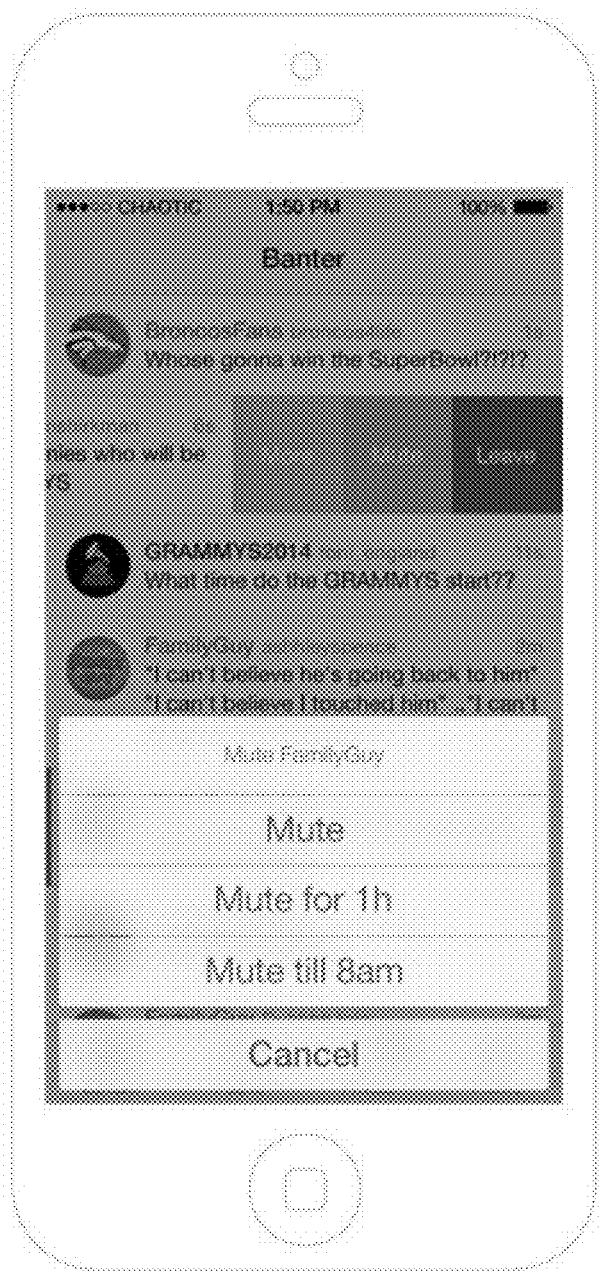
FIG. 3c shows a non-limiting example of interface for chat stream; in this case, an interface providing a user with the option, for each chat room in the stream, to mute the chat room, the interface adapted to allow the user to optionally mute the chat room for 1 hour, until the next day, or indefinitely.
Figure 3D:
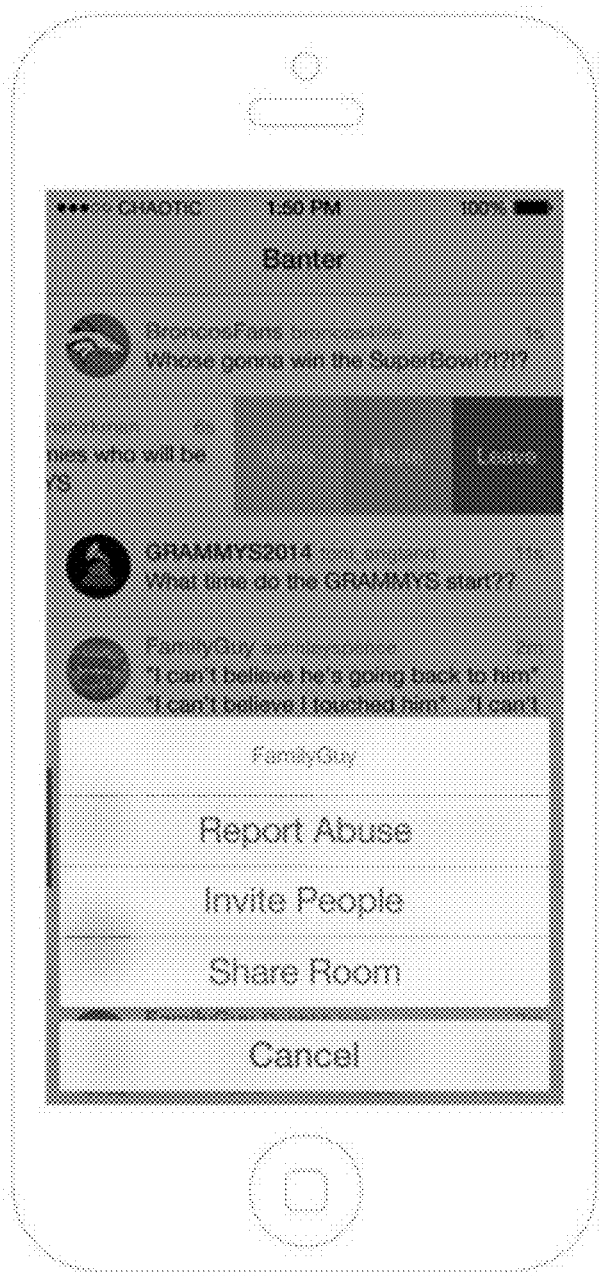
FIG. 3d shows a non-limiting example of an interface for chat stream; in this case, an interface providing a user with the option, for each chat room in the stream, to report abuse, invite people, or share room with other app users.

Referring to FIGS. 3b, 3c, and 3d, in particular embodiments, a chat application described herein provides confirmation screens for chat room actions. In these embodiments, where a user indicates that they want to leave a chat room, the confirmation includes "cancel" and "leave" options. Where a user indicates that they want to mute a chat room, the confirmation includes "mute," "mute for one hour," and "mute until 8 am" options. Where a user indicates that they want to access additional actions for a chat room, the confirmation includes "report abuse," "invite people," and "share room" options.

In some embodiments, the chat application offers a user the ability to block and unblock other users. In a particular embodiment, when a first user blocks a second user, the first user no longer sees messages from the second user, and the second user will not see messages posted by the first user. In further embodiments, the chat application includes software modules for viewing and managing lists of blocked users.

Figure 4:
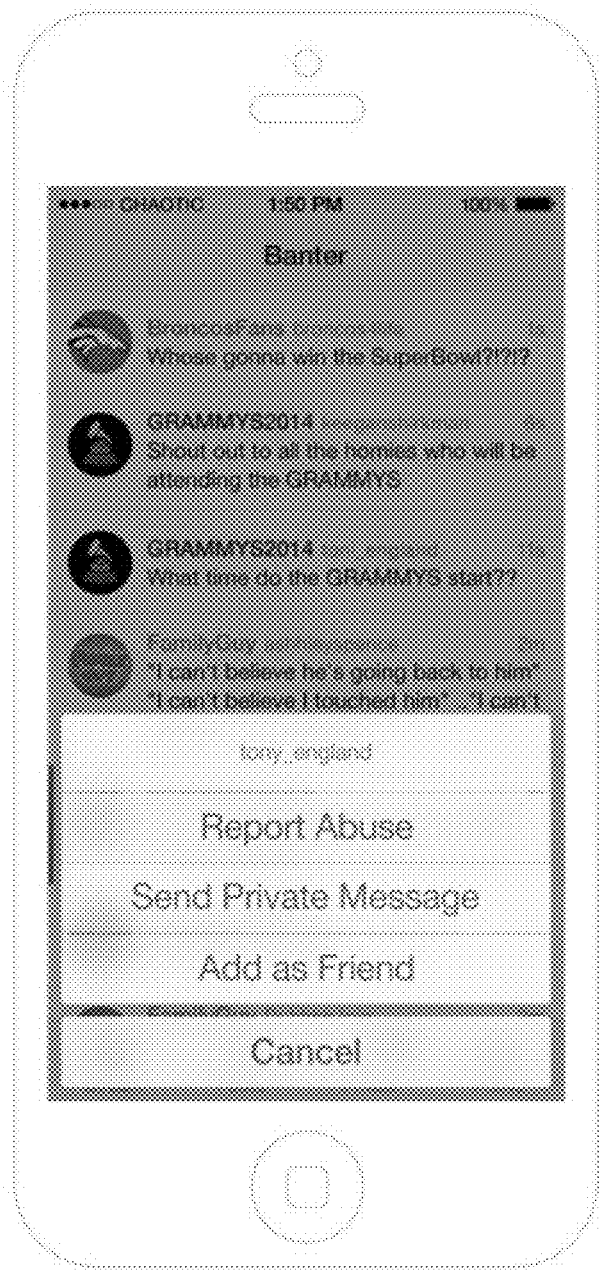
FIG. 4 shows a non-limiting example of an interface for chat stream; in this case, an interface providing a user with an option, for each user active in the user's chat stream, to report abuse by the user, send a private message to the user, or add the user as friend.

Referring to FIG. 4, in a particular embodiment, a chat application described herein includes an interface for chat stream providing a user with access to message options. In this embodiment, tapping and holding on a message in the chat stream provides options to report abuse by the sending user, send a private message to the sending user, or add the sending user as friend.

Topical Hierarchy of Chat Rooms

In some embodiments, the platforms, systems, media, and methods described herein include a hierarchy of chat topics, or use of the same. For example, in further embodiments, the platforms, systems, media, and methods described herein include a curated set of topics (e.g., a topic tree, a topic graph, etc.) for users to browse and find popular topics to chat about. In still further embodiments, if a topic does not exist in the topical hierarchy, then users can create their own topics and assign tags to them. If the tags match a curated topic, then they will appear as user-created rooms in the topical hierarchy.

Many formats and data structures are suitable for topical hierarchies of chat rooms described herein. By way of example, in some embodiments, global chat is the root topic, where if there are no users in any other topics below it, all users will be put in global chat. By way of further example, in some embodiments, a topic represents any subject, for example "gaming," and a topic contains one or more chat rooms. In further embodiments, a room is a chat room where users can send messages to each other. In a particular embodiment, a room is created when there is one user, but it is not opened until two users are present. In general, a room has a maximum number of users that is specific to each room; however, in a particular embodiment, there is a global maximum default of 2000 users per chat room.

In some embodiments, a hierarchy of chat topics includes featured topics curated by one or more editors. In some embodiments, a topical hierarchy of chat rooms includes trending topics that are identified based on an algorithm. In further embodiments, the algorithm comprises a weighted average ranking of: total number of users in the topic and % increase in users in last hour, with a minimum of 1000 users to qualify.

Referring to FIG. 17, in a particular embodiment, a hierarchy of chat topics includes a global chat root topic. Subordinate to the global chat root topic are, for example, featured topics (curated), trending topics (determined by algorithm), and a navigable tree or graph of all topics. In this embodiment, featured topics include a topic tagged "games." Further in this embodiment, the games topic includes a plurality of chat rooms including user generated chat rooms. Also in this embodiment, all topics are arranged into tiers with progressively more specific topics subordinate to more general topics to form sub-topics. In some embodiments, the hierarchy is a graph and topics are optionally connected to topics in other branches at any level in the hierarchy.

In some embodiments, a matchmaking service will dynamically open rooms when needed, and suggest alternate rooms and/or topics when there are low number of users (or low activity by users), or the user chooses to change rooms and/or topics. In further embodiments, the suggestion algorithm will traverse the topic graph and take in to consideration number of users and activity in its suggestions.

In some embodiments, the platforms, systems, media, and methods described herein include features to help users find chat rooms within the hierarchy of chat rooms about topics they're interested in. For example, in some embodiments, a user first picks a topic in a hierarchical tree structure of topics. Second, if only one user wants to talk about a particular topic, the technology reserves a "seat" for the user in a chat room about that topic. Third, when a second user indicates an interest in discussing that topic, the technology opens the chat room and notifies both users so they can enter the chat room and talk. In further embodiments, while waiting for a second user, the first user is placed in chat room at a higher-level topic (e.g., a more general topic) so the user can find a conversation. By way of further example, in a particular embodiment, a user browses a topical hierarchy to a "Games" category, and then to an "Xbox" sub-category. If no other users are in an Xbox chat room, but there are users in a Games chat room, then the user is matched to a chat room about Games, until a second (or subsequent) user enters the Xbox chat room, at which point the first user is notified that the new, populated Xbox chat room is available.

Figure 18:
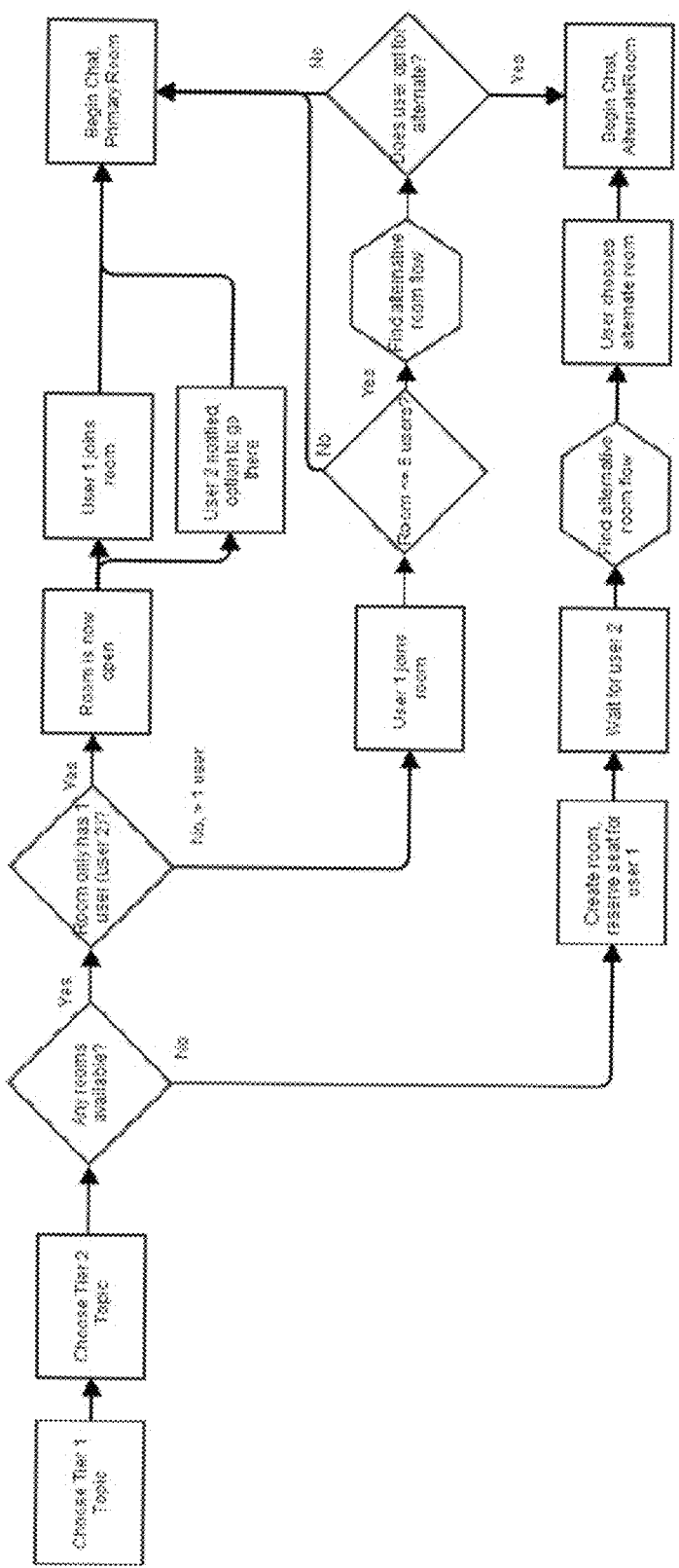
FIG. 18 shows a non-limiting example of a flow diagram depicting a process for selection of a topic in a chat application; in this case, a process where if a selected public chat room has less than the pre-determined number of users, the user chooses an alternate room in a related topic until notified that the room has achieved the minimum number of users.

Referring to FIG. 18, in a particular embodiment, a user optionally chooses a topic from with a hierarchy described herein. In this embodiment, a user chooses a first tier topic and a related, but more specific, second tier sub-topic. If no chat rooms are available (suitably populated and/or active), a new chat room is created, and a seat in the new room is reserved for the user. The user participates in a process, depicted in FIG. 19, to find an alternative chat room to use while waiting for a second or subsequent user. If a chat room in the selected topic is available (suitably populated and/or active), the user joins the room.

Figure 19:
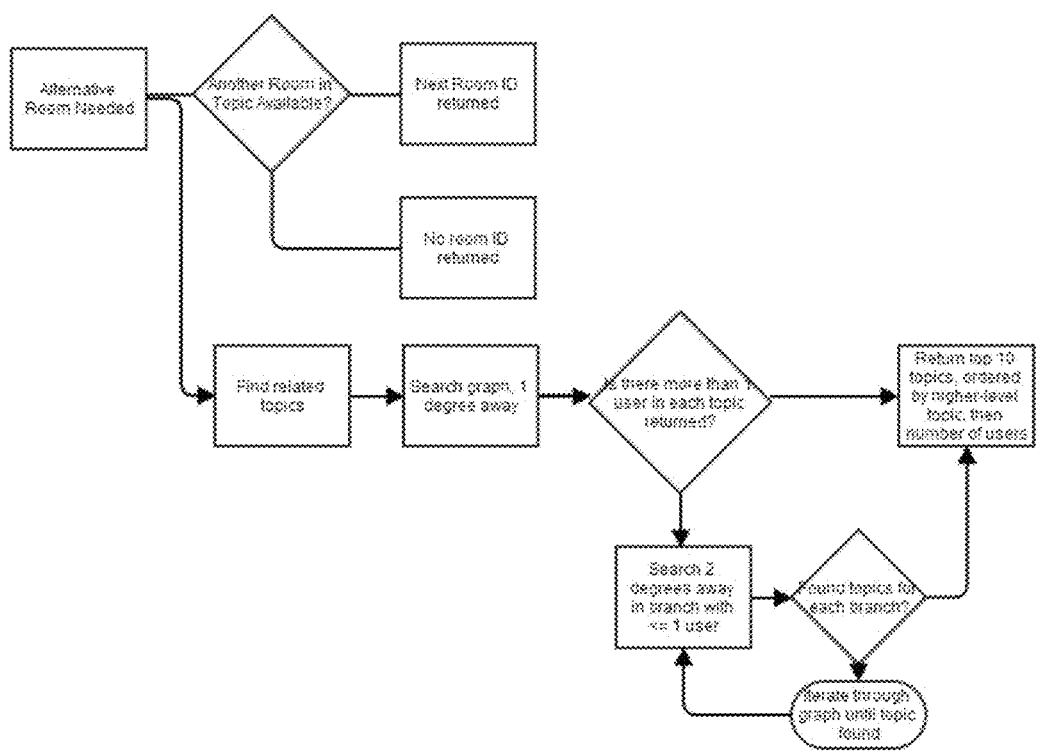
FIG. 19 shows a non-limiting example of a flow diagram depicting a process for selection of an alternative chat room; in this case, a process wherein topics related to a selected topic (e.g., close in proximity with a topical hierarchy) are identified and suggested to a user.

Referring to FIG. 19, in a particular embodiment, an alternative room is need due to user choice, a low number of users, or a low level of chat activity. In some cases, another room in the same topic is available and is provided as an option to the user. In other cases, another room in the same topic is not available and related topics are identified. In this embodiment, the system (or optionally the user) searches the hierarchy of topics, within one degree, for suitable related topics. If suitable topics are identified, the results are displayed to the user. If suitable topics are not identified, the system (or optionally the user) searches the hierarchy of topics, within two or more degrees until a suitable alternative room is identified.

Figure 20:
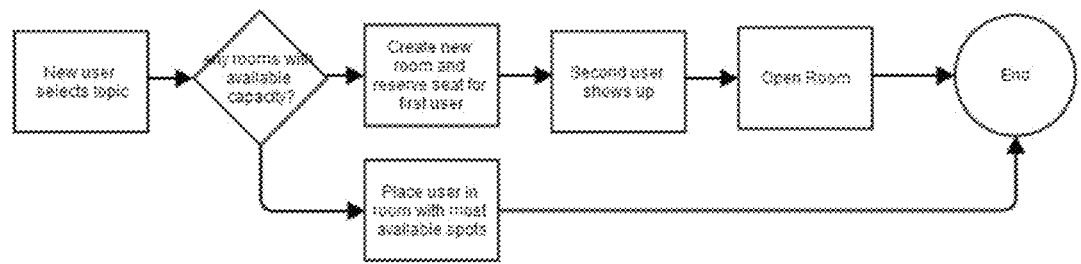
FIG. 20 shows a non-limiting example of a process flow diagram depicting a process for opening new chat rooms when existing chat rooms are at capacity; in this case, a process helping users enter chat rooms with an ideal number of users to achieve an active conversation.

Referring to FIG. 20, in a particular embodiment, a chat room achieves a maximum participant limit and the system automatically opens new rooms on the same or a related topic. Where the newly created rooms have available user capacity, the matchmaking service distributes new users according to an algorithm that optionally weights more heavily toward filling rooms with a low number of current participants. In this embodiment, a user selects a chat topic. If one or more chat rooms are available with user capacity remaining, the user is placed in the chat room with the highest number of open user spaces. If no chat room is available on the selected topic, a new chat room is created and a seat is reserved for the user in the new chat room. If and when a second or subsequent user requests to discuss the topic or enter the room, all interested users are notified and invited to enter the room.

Figure 21:
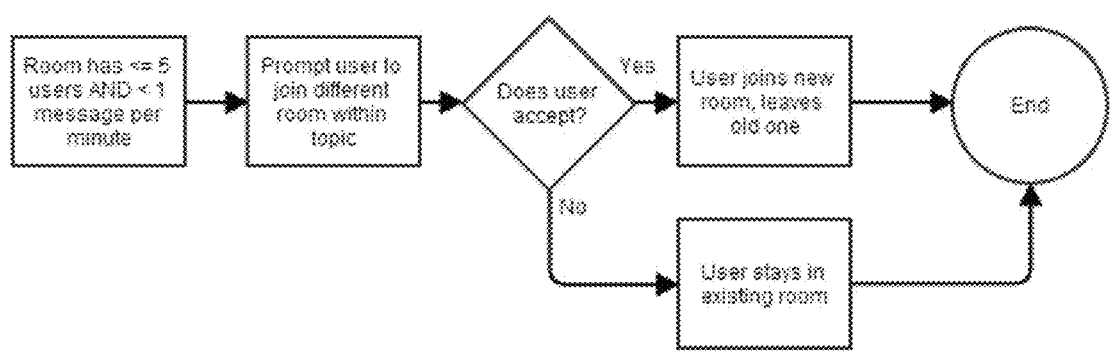
FIG. 21 shows a non-limiting example of a process flow diagram depicting a process for managing low activity in a chat room; in this case, a process wherein a user is prompted to join an alternative chat room with higher activity (e.g., number of users or frequency of chat messages.).

Referring to FIG. 21, in a particular embodiment, where a chat room has a low number of users and/or low chat activity, the matchmaking service assumes that public rooms with a low number of users and/or chat activity is idle and attempts to suggest rooms with more activity. In this embodiment, the user always has a choice to stay in their current chat room or go to a new chat room. For example, a chat room currently has less than five users and less than one message sent per minute. The users in this chat room or a user attempting to enter the chat room is prompted to join a different room within the same topic. If the user accepts the prompt, the user leaves the chat room and joins the new chat room. If the user declines the prompt, the user stays in the original chat room.

In some embodiments, the platforms, systems, media, and methods described herein include features to allow users to share a web link that deep-links to a particular chat room. See, e.g., FIGS. 3d and 6d. For example, in some embodiments, a user in a chat room talking about the 2014 Men's Slopestyle Olympics event can send out a link via SMS, email, Facebook, and/or Twitter via the standard mobile operating system controls. In a particular embodiment, a receiving user that taps on the link and has the chat application described herein, would automatically be linked in to the chat room in the app. In an alternative particular embodiment, if the receiving user does not have the chat application described herein, they would be directed to the appropriate app store download page.

Geolocation

In some embodiments, the platforms, systems, media, and methods described herein include location based chat, or use of the same. In further embodiments, a hierarchy of chat topics is customized to provide versions of each topic specifically relevant to a given location. In various embodiments, chat topics, chat rooms, and the like are location based such that they are relevant to a particular country, state, city, region, district, neighborhood, street, building, or business. For example, a user browsing to a chat topic on best restaurants is optionally directed to a chat room for best restaurants in the city in which they are currently located.

Geolocation is the identification of the real-world geographic location of an object, such as a computer, mobile smartphone, or a portable computing device such as a laptop or tablet computer. A location is suitably expressed in a number of ways including, by way of non-limiting examples, geographic coordinates (e.g., latitude and longitude), a place name (e.g., county, city, landmark, intersection, etc.), a physical street address, distance from a given location, presence within a specified radius from a given location, and a graphical depiction on a map. In some cases, geolocation involves geocoding to find associated latitude and longitude from other geographic data. In some cases, geolocation involves reverse geocoding to back code latitude and longitude coordinates to a readable address or place name.

Many methods of geolocation are suitable that utilize several underlying sources of location information. In some embodiments, a software module geolocates, for example, a consumer, a mobile processing device, a retail item, or a physical retail outlet using sources of location information including, by way of non-limiting examples, GPS coordinates provided by a processing device, triangulation between mobile phone towers and public masts (e.g., assistive GPS), Wi-Fi connection location, WHOIS performed on IP address or MAC address (e.g., Wi-Fi base station MAC address), GSM/CDMA cell IDs (e.g., identification, triangulation, and multilateration), and location information self-reported by a user. In some embodiments, location information includes position (e.g., latitude and longitude), elevation, heading, speed, orientation, and combinations thereof.

In some embodiments, a software module geolocates, for example, a user or a mobile processing device by using the HTML 5 geolocation API. In light of the disclosure provided herein, those of skill in the art will recognize that the HTML 5 geolocation API is supported in Internet Explorer 9.0+, Firefox 3.5+, Safari 5.0+, Chrome 5.0+, Opera 10.6+, iOS 3.0+, Android 2.0+, and Windows Phone 7.5+. In some embodiments, a software module geolocates, for example, a consumer, a mobile processing device, or a business using methods aligned with W3C Geolocation API (available at: http://dev.w3.org/geo/api/spec-source.html). The W3C Geolocation API defines an interface to location information associated with a processing device (e.g., smartphone, tablet computer, laptop computer, etc.) hosting the implementation, such as latitude and longitude.

In some embodiments, the platforms, systems, media, and methods disclosed herein perform geolocation by one method, such as those disclosed herein. In other embodiments, the platforms, systems, media, and methods disclosed herein perform geolocation by more than one method.

In some embodiments, the geolocation of, for example, a user or a mobile processing device is accurate to within at least 100, 90, 80, 70, 60, 50, 40, 30, 20, 10, 9, 8, 7, 6, 5, 4, 3, 2, 1 or fewer kilometers, including increments therein. In further embodiments, the geolocation is accurate to within at least 1000, 900, 800, 700, 600, 500, 400, 300, 200, 100, 90, 80, 70, 60, 50, 40, 30, 20, 10, 9, 8, 7, 6, 5, 4, 3, 2, 1 or fewer meters, including increments therein.

Implementation

The platforms, systems, media, and methods described herein are suitably implemented in a wide variety of technologies. In some embodiments, the chat applications described herein are completely cross-platform in real time. In further embodiments, users optionally utilize the chat application to chat across any suitable device/operating system. In various embodiments, suitable devices include, by way of non-limiting examples, Android phone/tablet, iOS phone/tablet, Amazon tablet, Mac desktop client, Windows 8 app/desktop client, and HTML5 client embedded on a dedicated website or a third party publisher website.

Digital Processing Device

In some embodiments, the platforms, systems, media, and methods described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM Black- Berry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of user and chat room information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way.

Example 1

A user employs a chat application as described herein that is implemented as a mobile application. The user downloads the chat application from an online application store and installs it on his smartphone. He accesses a mobile topical hierarchy of chat rooms and searches available public chat rooms discussing his current interest in the topic of popular television series. The generated search results in a wide range of topics including broad topics such as television program genre and broadcast stations, to very specific topics such as particular television shows, actors, and episodes. The generated search results are arranged by hierarchically and after viewing the search results, the user decides to join the "Most Popular Television Programs" chat room. He then decides to join other similar chat rooms and utilizes the navigation bar to launch a search for similar chat rooms. The search results are once again presented in topically hierarchical form. User then navigates up and down the generated list, and also joins chat rooms discussing "Big Bang Theory" and "Discovery Channel."

Example 2

The user of Example 1 determines that he is also interested entering a wholly different topic discussion, such as the best bars and restaurants located in Austin, Tex. He adds a new public room to his list of entered public chat rooms and searches for chat rooms dedicated to his interest in particular bars and restaurants. He sees a potential chat room titled "BestBeerBars," joins the room, and writes a chat message; however, the chat room has no other users. Accordingly, a notification prompts user to join a different room topic and in the meantime, the app will reserve his seat in "BestBeerBarAustin" and notify him the chat room has sufficient number of users and is open to join. The user then finds a different chat room titled "ScotchBars" but later also later joins "BestBeerBars" when he is notified the opening of "BestBeerBars" chat room.

Example 3

The user of Example 1 is also interested a wide range of chat room topics such as restaurants, sports, and music. As such, he is active in 15 different public and private chat rooms. The user views a chat stream feature, which gives him all the updated activity from the various entered chat rooms and allows him to monitor all of his chat room activity simultaneously without having to go into each individual chat room separately.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A chat platform comprising:
   a. a plurality of mobile processors each configured to provide a mobile application comprising:
      i. a software module for allowing a user to browse and select a public chat room, the public chat room selected from a topical hierarchy of public chat rooms;
      ii. a software module for allowing the user to create and enter a chat room, the chat room a public chat room or a private chat room;
      iii. a software module for presenting a chat stream to the user, the chat stream comprising chat messages from one or more entered chat rooms, the chat messages organized to form the stream;
   b. a server processor configured to provide a server application comprising:

i. a database of public chat rooms and private chat rooms, each chat room comprising a topic, the public chat rooms organized into a hierarchy of public chat rooms;
ii. a software module for receiving a request from the user to enter a selected public chat room and in response to the request:
entering the user into a public chat room higher in the topical hierarchy of public chat rooms where the user selected public chat room has less than the pre-determined number of users;
iii. a software module for transmitting a notification to the user when the user selected public chat room meets the pre-determined number of users;
iv. a software module for consolidating chat messages from one or more chat rooms entered by the user to form a chat stream for the user.

2. The platform of claim 1, wherein the topical hierarchy of public chat rooms is filtered based on location of the user and comprises chat rooms with topics relevant to the location.

3. The platform of claim 1, wherein the mobile application further comprises a software module for allowing the user to view a list of public rooms entered, the list configured to allow the user to swipe to navigate between public rooms.

4. The platform of claim 1, wherein the mobile application further comprises a software module for allowing the user to view a list of private rooms entered, the list configured to allow the user to swipe to navigate between private rooms.

5. The platform of claim 1, wherein the pre-determined number of users is 2 to 3000 users.

6. The platform of claim 1, wherein the software module for allowing the user to create and enter a chat room includes features for inviting other users to join a created chat room.

7. The platform of claim 1, wherein the software module for allowing the user to create and enter a chat room includes features for tagging a public chat room, the tags used to integrate the public chat room into the topical hierarchy of public chat rooms.

8. The platform of claim 1, wherein the software module for allowing the user to create and enter a chat room includes features for configuring access control for a private chat room.

9. The platform of claim 1, wherein the software module for allowing the user to create and enter a chat room includes features for customizing the appearance of the chat room in the user interface of the mobile application.

10. The platform of claim 1, wherein the mobile application further comprises a software module for allowing the user to navigate up and down in the topical hierarchy of public chat rooms.

11. The platform of claim 1, wherein the mobile application further comprises a software module for allowing the user to select an anonymity setting from a plurality of anonymity settings, the selected anonymity setting determining information about the user available to other chat users.

12. The platform of claim 1, wherein the mobile application further comprises a software module for allowing the user to configure a plurality of identity profiles, an identity profile determining how the user is identified to other users in a chat room.

13. The platform of claim 1, wherein the server application further comprises a software module for recommending a chat room to the user, the recommendation based at least in part on activity of the chat room.

14. The platform of claim 1, wherein the server application further comprises a software module for creating a new chat room, the creation of the new chat room based at least in part on topics and activity of existing chat rooms.

15. A computer-implemented system comprising:
a. a mobile processing device comprising an operating system configured to perform executable instructions and a memory device;
b. a mobile application including instructions executable by the mobile processing device to create a chat environment comprising:
i. a software module for allowing a user to browse and select a public chat room, the public chat room selected from a topical hierarchy of public chat rooms; wherein if a user selects a public chat room having less than a pre-determined number of users, the user is entered into a public chat room higher in the topical hierarchy of public chat rooms and the user is notified when the user selected public chat room achieves the pre-determined number of users;
ii. a software module for allowing the user to create and enter a chat room, the user designating the chat room as a public chat room or a private chat room, the chat room comprising a topic; and
iii. a software module for presenting a chat stream to the user, the chat stream comprising chat messages from one or more entered chat rooms, the chat messages chronologically organized to form the stream.

16. The system of claim 15, wherein the topical hierarchy of public chat rooms is filtered based on location of the user and comprises chat rooms with topics relevant to the location.

17. The system of claim 15, wherein the software module for allowing the user to create and enter a chat room includes features for tagging a public chat room, the tags used to integrate the public chat room into the topical hierarchy of public chat rooms.

18. The system of claim 15, wherein the chat environment further comprises a software module for allowing the user to navigate up and down in the topical hierarchy of public chat rooms.

19. The system of claim 15, wherein the chat environment further comprises a software module for allowing the user to select an anonymity setting from a plurality of anonymity settings, the selected anonymity setting determining information about the user available to other chat users.

20. The system of claim 15, wherein the chat environment further comprises a software module for allowing the user to configure a plurality of identity profiles, an identity profile determining how the user is identified to other users in a chat room.

21. The system of claim 15, wherein the chat environment further comprises a software module for recommending a chat room to the user, the recommendation based at least in part on activity of the chat room.

22. The system of claim 15, wherein the chat environment further comprises a software module for creating a new chat room, the creation of the new chat room based at least in part on topics and activity of existing chat rooms.

23. Non-transitory computer-readable storage media encoded with a mobile application including instructions executable by a processor to create a chat environment comprising:
a. a software module for allowing a user to browse and select a public chat room, the public chat room selected from a topical hierarchy of public chat rooms; wherein if a user selects a public chat room having less than a pre-determined number of users, the user is entered into a public chat room higher in the topical hierarchy of public chat rooms and the user is notified when the user selected public chat room achieves the pre-determined number of users;

b. a software module for allowing the user to create and enter a chat room, the user designating the chat room as a public chat room or a private chat room, the chat room comprising a topic; and c. a software module for presenting a chat stream to the user, the chat stream comprising chat messages from one or more entered chat rooms, the chat messages chronologically organized to form the stream.

24. The media of claim 23, wherein the topical hierarchy of public chat rooms is filtered based on location of the user and comprises chat rooms with topics relevant to the location.

25. The media of claim 23, wherein the software module for allowing the user to create and enter a chat room includes features for tagging a public chat room, the tags used to integrate the public chat room into the topical hierarchy of public chat rooms.

26. The media of claim 23, wherein the chat environment further comprises a software module for allowing the user to navigate up and down in the topical hierarchy of public chat rooms.

27. The media of claim 23, wherein the chat environment further comprises a software module for allowing the user to select an anonymity setting from a plurality of anonymity settings, the selected anonymity setting determining information about the user available to other chat users.

28. The media of claim 23, wherein the chat environment further comprises a software module for allowing the user to configure a plurality of identity profiles, an identity profile determining how the user is identified to other users in a chat room.

29. The media of claim 23, wherein the chat environment further comprises a software module for recommending a chat room to the user, the recommendation based at least in part on activity of the chat room.

30. The media of claim 23, wherein the chat environment further comprises a software module for creating a new chat room, the creation of the new chat room based at least in part on topics and activity of existing chat rooms.

* * * * *